(12) United States Patent
Kiyota et al.

(10) Patent No.: US 12,304,401 B2
(45) Date of Patent: May 20, 2025

(54) GROMMET

(71) Applicant: YAZAKI CORPORATION, Tokyo (JP)

(72) Inventors: Hirotaka Kiyota, Makinohara (JP); Takeshi Onoda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 202 days.

(21) Appl. No.: 18/343,739

(22) Filed: Jun. 29, 2023

(65) Prior Publication Data

US 2024/0001870 A1 Jan. 4, 2024

(30) Foreign Application Priority Data

Jun. 30, 2022 (JP) ................................. 2022-105525

(51) Int. Cl.
  *B60R 16/02* (2006.01)
  *H02G 3/22* (2006.01)
  *H02G 15/013* (2006.01)

(52) U.S. Cl.
  CPC ................ *B60R 16/0222* (2013.01)

(58) Field of Classification Search
  CPC ..... B60R 16/0222; H02G 3/22; H02G 15/013
  See application file for complete search history.

(56) References Cited

U.S. PATENT DOCUMENTS

| 11,242,017 | B2* | 2/2022 | Ando | B60R 16/0222 |
| 2012/0146295 | A1 | 6/2012 | Suzuki | |
| 2021/0101544 | A1* | 4/2021 | Hattori | B60R 16/0222 |
| 2024/0274329 | A1* | 8/2024 | Ando | B60R 16/0222 |

FOREIGN PATENT DOCUMENTS

| JP | H01-139320 U | 9/1989 |
| JP | H05-223114 A | 8/1993 |
| JP | H08-251769 A | 9/1996 |
| JP | 2002-305832 A | 10/2002 |
| JP | 2012-130085 A | 7/2012 |
| JP | 2018-186622 A | 11/2018 |

* cited by examiner

*Primary Examiner* — Timothy J Thompson
*Assistant Examiner* — Amol H Patel
(74) *Attorney, Agent, or Firm* — KENEALY VAIDYA LLP

(57) ABSTRACT

A grommet includes a base member, an annular water stop member, and a holding mechanism. The base member is made of a synthetic resin material having an insulation property through which a wiring material having electrical conductivity is inserted to be passed through a through hole of an insertion target. The annular water stop member is made of an elastically deformable synthetic resin material softer than the base member, and disposed integrally with the base member. The holding mechanism causes the base member and the water stop member to be held by an annular flat plate part on a periphery of the through hole of the insertion target and an annular projection part that is projected from an end part of an inner peripheral edge of the annular flat plate part toward one hole axis direction of the through hole.

8 Claims, 16 Drawing Sheets

GROMMET

CROSS-REFERENCE TO RELATED APPLICATION(S)

The present application claims priority to and incorporates by reference the entire contents of Japanese Patent Application No. 2022-105525 filed in Japan on Jun. 30, 2022.

BACKGROUND OF THE INVENTION

1. Field of the Invention

The present invention relates to a grommet.

2. Description of the Related Art

Conventionally, in a wire harness, a wiring material such as an electric wire is inserted through a through hole disposed on an insertion target (for example, a panel and the like of a vehicle body of a vehicle) to draw the wiring material from one space into another space separated by the insertion target. Due to this, to protect the wiring material from a periphery of the through hole and prevent infiltration of liquid into a gap between the through hole and the wiring material, a grommet for closing the gap is attached to the insertion target. For example, the grommet includes a cylindrical part through which the wiring material is inserted, and an engagement part that is disposed on an outer peripheral wall of the cylindrical part to be fitted to the periphery of the through hole of the insertion target, and is formed of a synthetic resin material having flexibility such as rubber (refer to Japanese Patent Application Laid-open No. JP H08-251769).

In a conventional grommet, the entire engagement part thereof has flexibility, so that the engagement part can be fitted to the periphery by absorbing tolerance variations of the periphery of the through hole of the insertion target while securing a waterproof property. On the other hand, in this grommet, a dimensional tolerance is set for the engagement part thereof, so that, along with the tolerance variations of the periphery of the through hole, holding force of the engagement part with respect to the periphery may be lowered, or the waterproof property may be lowered due to the gap generated between the periphery and the engagement part.

SUMMARY OF THE INVENTION

Thus, the present invention aims at providing a grommet that may secure both of a waterproof property and holding force irrespective of tolerance variations.

In order to achieve the above mentioned object, a grommet according to one aspect of the present invention includes a base member made of a synthetic resin material having an insulation property through which a wiring material having electrical conductivity is inserted to be passed through a through hole of an insertion target; an annular water stop member made of an elastically deformable synthetic resin material softer than the base member, and disposed integrally with the base member; and a holding mechanism that causes the base member and the water stop member to be held by an annular flat plate part on a periphery of the through hole of the insertion target and an annular projection part that is projected from an end part of an inner peripheral edge of the annular flat plate part toward one hole axis direction of the through hole, wherein the base member includes: an annular flange including an outer peripheral part that is disposed to be coaxially opposed to an inner peripheral part of the annular flat plate part with a gap in another hole axis direction of the through hole; a cylindrical body that has a cross section orthogonal to a hole axis of the through hole having a shape similar to a shape of a cross section of the annular projection part orthogonal to the hole axis of the through hole, and is coaxially projected from the flange toward the one hole axis direction to be inserted through the through hole on an inner side than the outer peripheral part of the flange; a plurality of cantilever locking piece parts disposed in a circumferential direction with respect to the cylindrical body, a tip of the cantilever locking piece part folded back in the other hole axis direction from an outer peripheral surface side of the cylindrical body being caused to be a free end, the free end side being projected from the outer peripheral surface of the cylindrical body, and the cantilever locking piece part being able to be bent to change a projecting amount on the free end side from the outer peripheral surface; and a plurality of locking parts that are disposed at respective free ends of the locking piece parts to lock a locking end part on the one hole axis direction side of the annular projection part from the one hole axis direction side of the locking end part, the water stop member includes: an annular main body that is disposed coaxially and integrally with a wall surface on the one hole axis direction side of the outer peripheral part of the flange; and an annular lip that is projected from the main body in the one hole axis direction, and brought into intimate contact with the inner peripheral part of the annular flat plate part over a round in a circumferential direction while being elastically deformed, the locking parts are arranged in the hole axis direction at the free end of the locking piece part, and one of the locking parts adjacent to each other in the hole axis direction is arranged to be closer to the outer peripheral surface side of the cylindrical body and the flange side than the other one of the adjacent locking parts, and the holding mechanism locks the locking end part by any one of the locking parts, and causes pressing force of the lip in an elastically deformed state to act on the inner peripheral part of the annular flat plate part to cause the base member and the water stop member to be held by the annular flat plate part and the annular projection part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
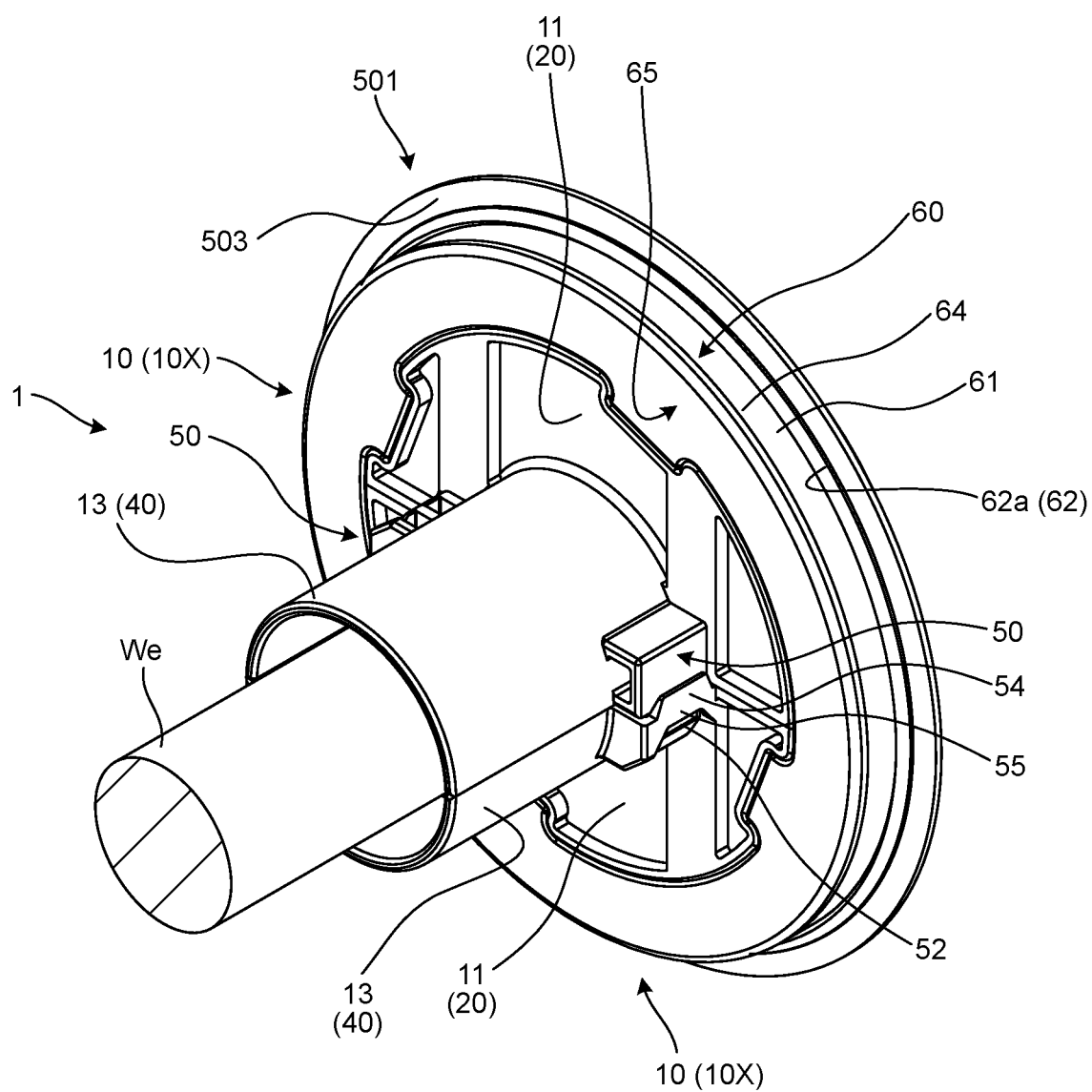
FIG. 1 is a perspective view illustrating a grommet according to an embodiment after being attached to an insertion target.

The following describes an embodiment of a grommet according to the present invention in detail based on the drawings. The present invention is not limited to this embodiment.

Embodiment

The following describes an embodiment of the grommet according to the present invention based on FIG. 1 to FIG. 16.

The reference numeral 1 in FIG. 1 to FIG. 9 denotes the grommet according to the present embodiment. The grommet 1 protects a wiring material We having electrical conductivity to be passed through a through hole 502 of an insertion target 501 from a periphery of the through hole 502 of the insertion target 501, and prevents infiltration of liquid (water and the like) into a gap between the periphery and the wiring material We (FIG. 1 to FIG. 6). Thus, the grommet 1 is attached to the periphery of the through hole 502 of the insertion target 501 after the wiring material We is inserted through the through hole 502.

Herein, the wiring material We is an electric wire (an electric wire as a communication line, an electric wire as a power supply line, and the like), for example. For example, in a case of a vehicle, the insertion target 501 is a wall body such as a panel and the like of a vehicle body. The wiring material We is inserted through the through hole 502 of the insertion target 501 to be routed between two spaces separated by the insertion target 501. For example, the wiring material We establishes communication between devices in the respective spaces, or supplies electric power from a power source in one of the spaces to electric equipment in the other space. Herein, across the insertion target 501, one hole axis direction side of the through hole 502 is a vehicle interior side, and another hole axis direction side of the through hole 502 is a vehicle exterior side.

The periphery of the through hole 502 of the insertion target 501 includes a flat plate part having an annular shape (hereinafter, referred to as an "annular flat plate part") 503, and a projection part having an annular shape (hereinafter, referred to as an "annular projection part") 504 projected from an end part of an inner peripheral edge of the annular flat plate part 503 toward the one hole axis direction of the through hole 502 (FIG. 1 to FIG. 6). The grommet 1 is attached to the annular flat plate part 503 and the annular projection part 504 on the periphery of the through hole 502 of the insertion target 501. For example, the insertion target 501 is shaped by press forming, and the annular flat plate part 503 and the through hole 502 are formed at the same time. In the insertion target 501, the annular projection part 504 is formed by burring processing on the periphery of the through hole 502. Herein, the annular flat plate part 503 is formed in a ring shape, and the through hole 502 is formed in a circular shape. Additionally, herein, the annular projection part 504 is formed in a ring shape.

The grommet 1 includes a base member 10X through which the wiring material We is inserted (FIG. 1 to FIG. 10). The base member 10X may be constituted of one member, or may be constituted of a plurality of members assembled to each other. The base member 10X described herein includes two base members (a first base member, a second base member) assembled to each other. The two base members may be members respectively having different shapes, or the same members having the same shape. In the grommet 1 described herein, the same members having the same shape (base members 10, 10) are used as the two base members (FIG. 1 to FIG. 10).

The base member 10X includes at least an annular flange 20 and a cylindrical body 30 on the same axis, and the wiring material We is inserted to an inner side thereof (FIG. 1 to FIG. 9). The base member 10X described herein includes a tubular body 40 in addition to the flange 20 and the cylindrical body 30 on the same axis, and the wiring material We is inserted to an inner side thereof (FIG. 1, and FIG. 4 to FIG. 9). Herein, on the same axis, the cylindrical body 30 is projected toward one side from the flange 20, and the tubular body 40 is projected toward the other side from the flange 20.

In the base member 10X described herein, as described later, the annular flange 20, the cylindrical body 30, and the tubular body 40 are coaxially formed by the base members 10, 10 assembled to each other. Thus, a holding mechanism (hereinafter, referred to as a "base holding mechanism") 50 is disposed between the two base members 10, to hold them in an assembled state (FIG. 1 to FIG. 3, and FIG. 7 to FIG. 9).

Figure 4:
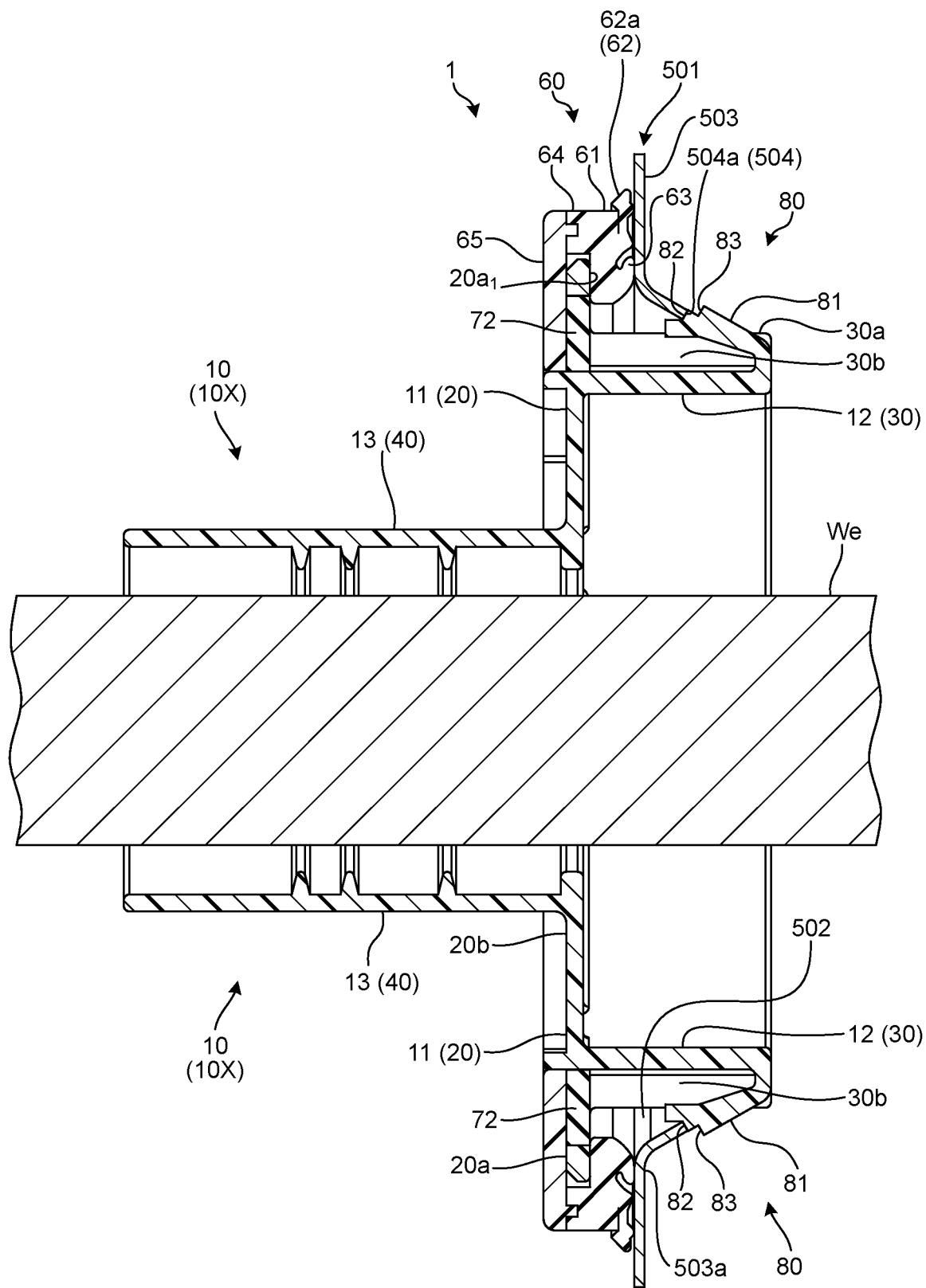
FIG. 4 is a diagram illustrating a cross section along the line X-X in FIG. 2.
Figure 5:
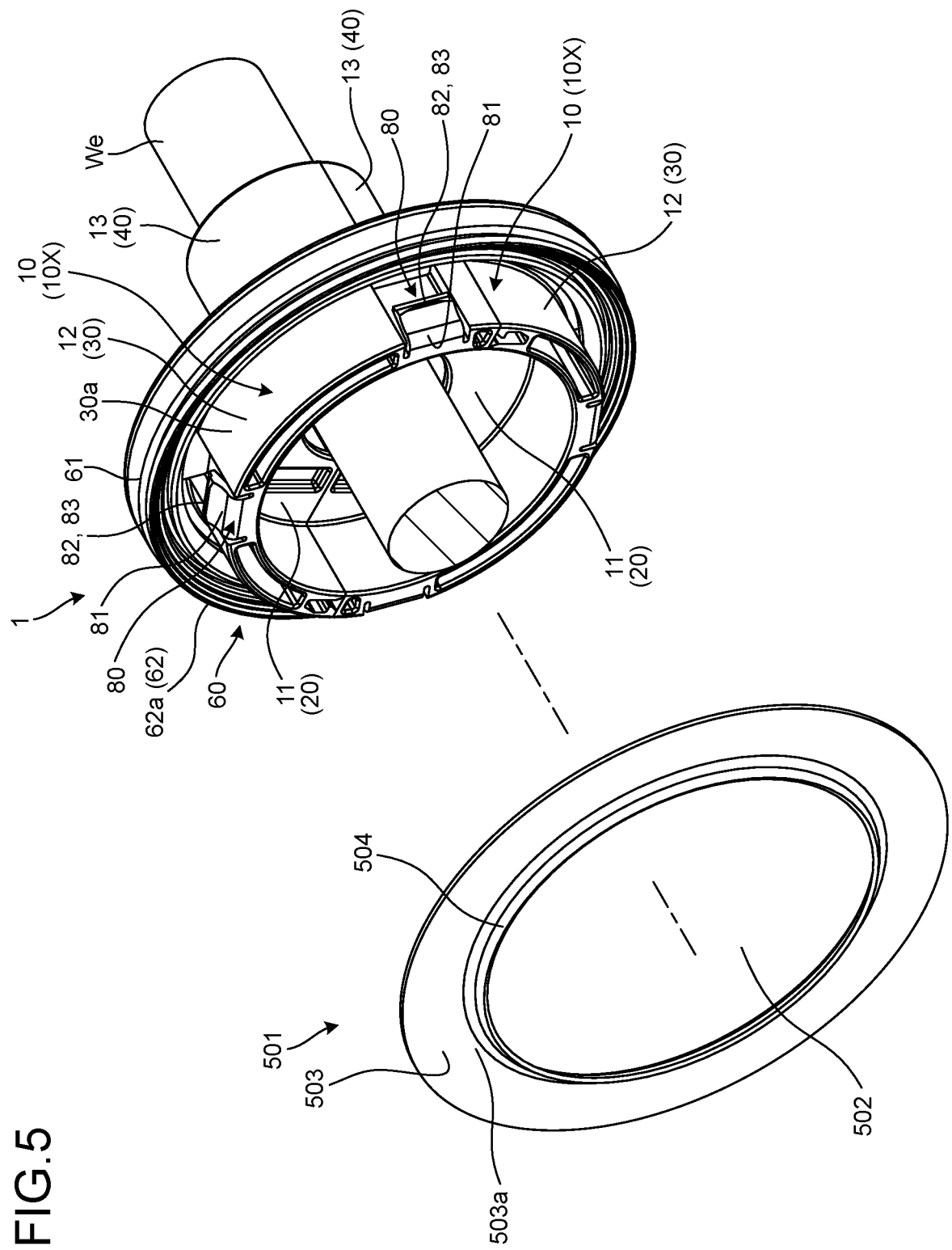
FIG. 5 is a perspective view of the grommet according to the embodiment before being attached to the insertion target viewed from another angle.

The grommet 1 also includes an annular water stop member 60 assembled to the base member 10X (the base members 10, 10 assembled to each other) (FIG. 1, FIG. 4 to FIG. 9, and FIG. 11). The water stop member 60 is interposed between an outer peripheral part 20a of the flange 20 and an inner peripheral part 503a of the annular flat plate part 503, and fills a gap therebetween to prevent infiltration of liquid (water and the like) into the gap (FIG. 4).

The base member 10X (base members 10, 10) is formed of a synthetic resin material having an insulation property. Herein, for example, the base member 10X (base members 10, is formed by using hard resin such as plastic.

The two base members 10, 10 are assembled to each other by causing bonding surfaces 10a to abut on each other (FIG. 2, FIG. 3, FIG. 7 and FIG. 8). The two base members 10 sandwich the wiring material We in the assembled state to achieve a state in which the wiring material We is inserted therethrough. Herein, by assembling the two base members 10, 10 to each other, the flange 20 having a ring shape, the cylindrical body 30 having a cylindrical shape, and the tubular body 40 having a tubular shape are formed. Herein, exemplified is the tubular body 40 as a straight tube. Alternatively, the tubular body 40 may be bent after being projected from the flange 20.

Figure 6:
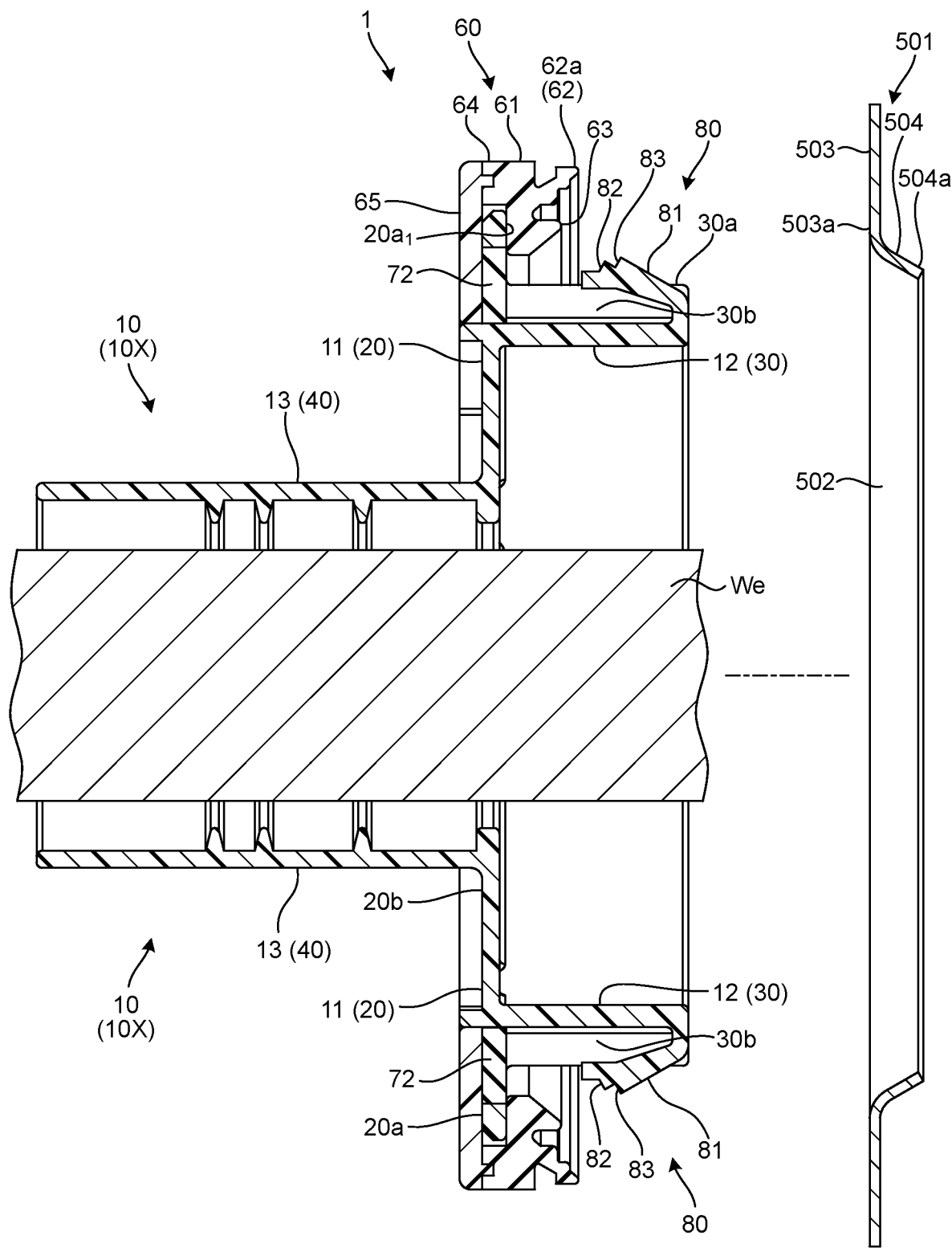
FIG. 6 is a diagram corresponding to the cross section along the line X-X in FIG. 2, and illustrates a state before being attached to the insertion target.

The flange 20 includes the outer peripheral part 20a that is disposed to be coaxially opposed to the inner peripheral part 503a of the annular flat plate part 503 with a gap in the other hole axis direction of the through hole 502 (FIG. 4, and FIG. 6 to FIG. 9). The wiring material We is inserted through the flange 20 on an inner side than an inner peripheral part 20b (FIG. 4 and FIG. 6). The flange 20 described herein is formed in a ring plate shape, and includes the outer peripheral part 20a having a ring shape and the inner peripheral part 20b having a ring shape. The outer peripheral part 20a having a ring shape of the flange 20 is disposed to be coaxially opposed to the inner peripheral part 503a having a ring shape of the annular flat plate part 503 with a gap therebetween when the grommet 1 is attached to the periphery of the through hole 502 (the annular flat plate part 503, the annular projection part 504) of the insertion target 501 in a prescribed attachment state.

The two base members 10, 10 respectively include split flanges 11 to form the flange 20 by causing the bonding surfaces 10a thereof to abut on each other (FIG. 1 to FIG. 9). The split flange 11 described herein is obtained by splitting the flange 20 into halves along a center axis, and is formed in a semicircular-arc shape.

A cross section of the cylindrical body 30 orthogonal to a hole axis of the through hole 502 has a shape similar to that of a cross section of the annular projection part 504 orthogonal to the hole axis of the through hole 502, and the cylindrical body 30 is coaxially projected from the flange 20 toward the one hole axis direction to be inserted through the through hole 502 on an inner side than the outer peripheral part 20a of the flange 20 (FIG. 4 and FIG. 6). The cylindrical body 30 described herein is projected from between the outer peripheral part 20a and the inner peripheral part 20b of the flange 20. The wiring material We is passed through the cylindrical body 30 on an inner side thereof.

The two base members 10, 10 respectively include split cylinders 12 to form the cylindrical body 30 by causing the bonding surfaces 10a thereof to abut on each other (FIG. 2, and FIG. 4 to FIG. 9). The split cylinder 12 described herein is obtained by splitting the cylindrical body 30 into halves along the center axis, and is formed in a semicircular-arc shape.

A cross section of the tubular body 40 orthogonal to the hole axis of the through hole 502 has a shape similar to that of the cross section of the annular projection part 504 orthogonal to the hole axis of the through hole 502, and the tubular body 40 is coaxially projected from the inner peripheral part 20b of the flange 20 toward the other hole axis direction (that is, in a direction opposite to that of the cylindrical body 30) (FIG. 4 and FIG. 6). The wiring material We is passed through the tubular body 40.

The two base members 10, 10 respectively include split tubes 13 to form the tubular body 40 by causing the bonding surfaces 10a thereof to abut on each other (FIG. 1, and FIG. 4 to FIG. 9). The split tube 13 described herein is obtained by splitting the tubular body 40 into halves along the center axis, and is formed in a semicircular-arc shape.

Figure 7:
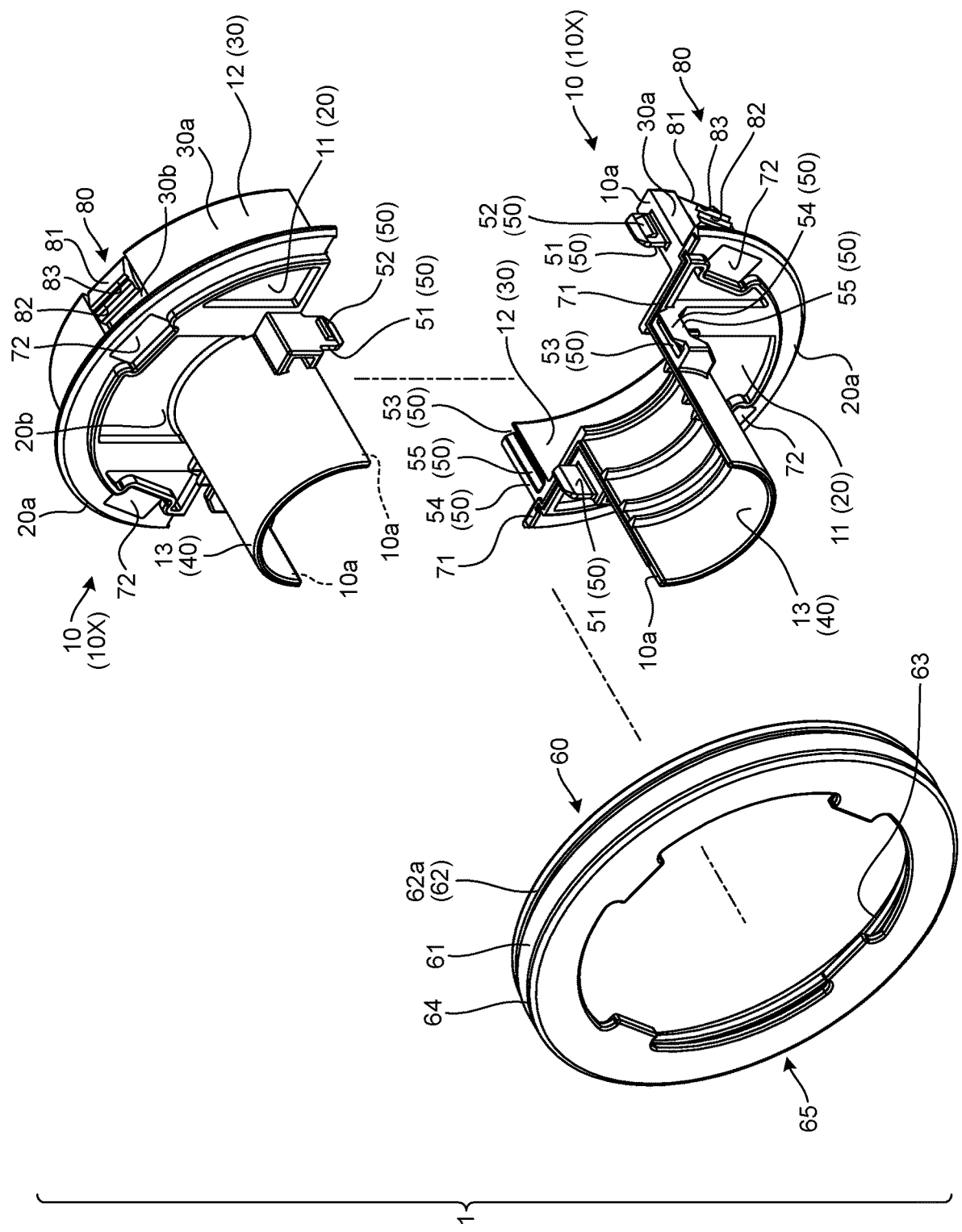
FIG. 7 is an exploded perspective view illustrating the grommet according to the embodiment.
Figure 8:
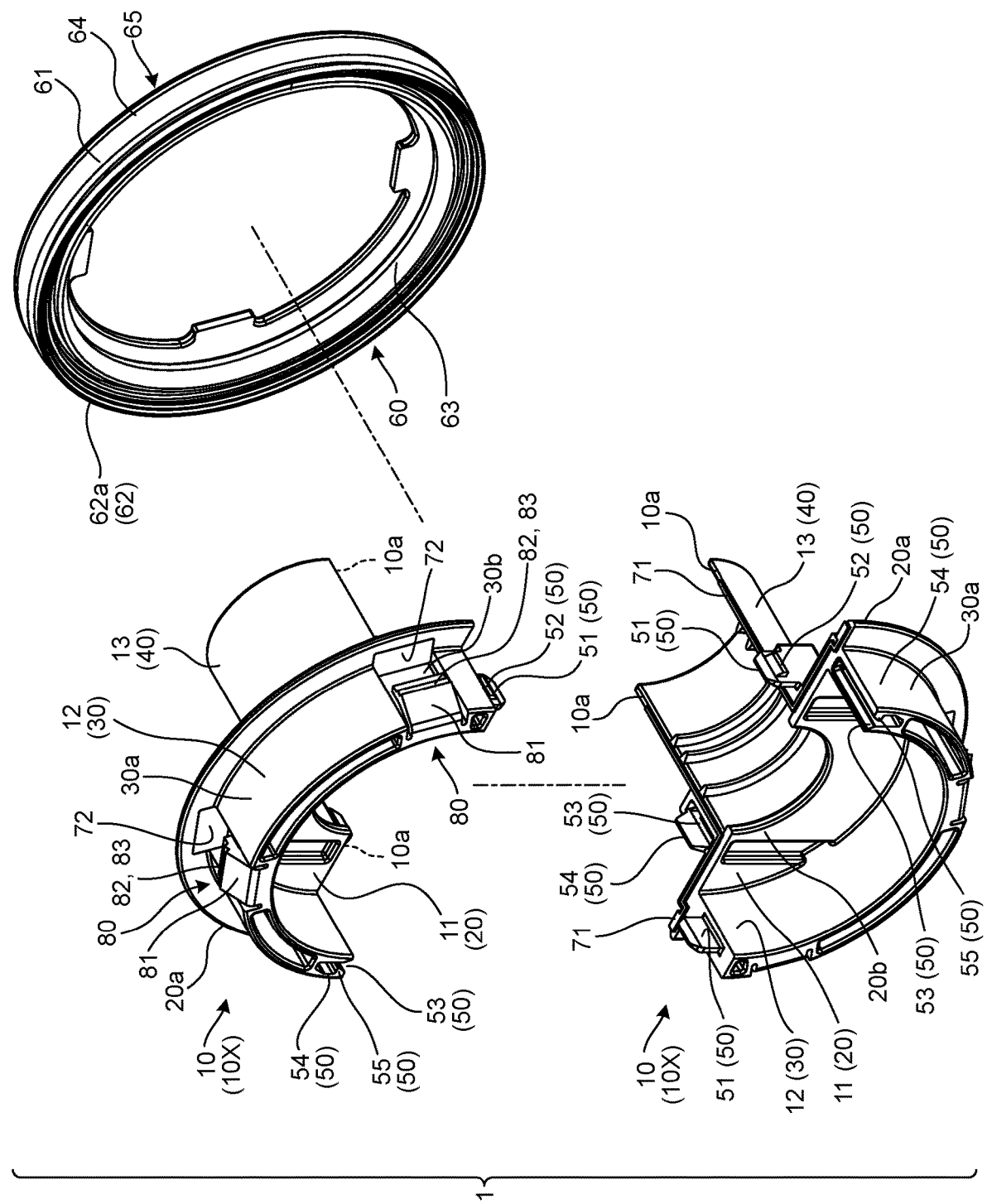
FIG. 8 is an exploded perspective view of the grommet according to the embodiment viewed from another angle.
Figure 9:
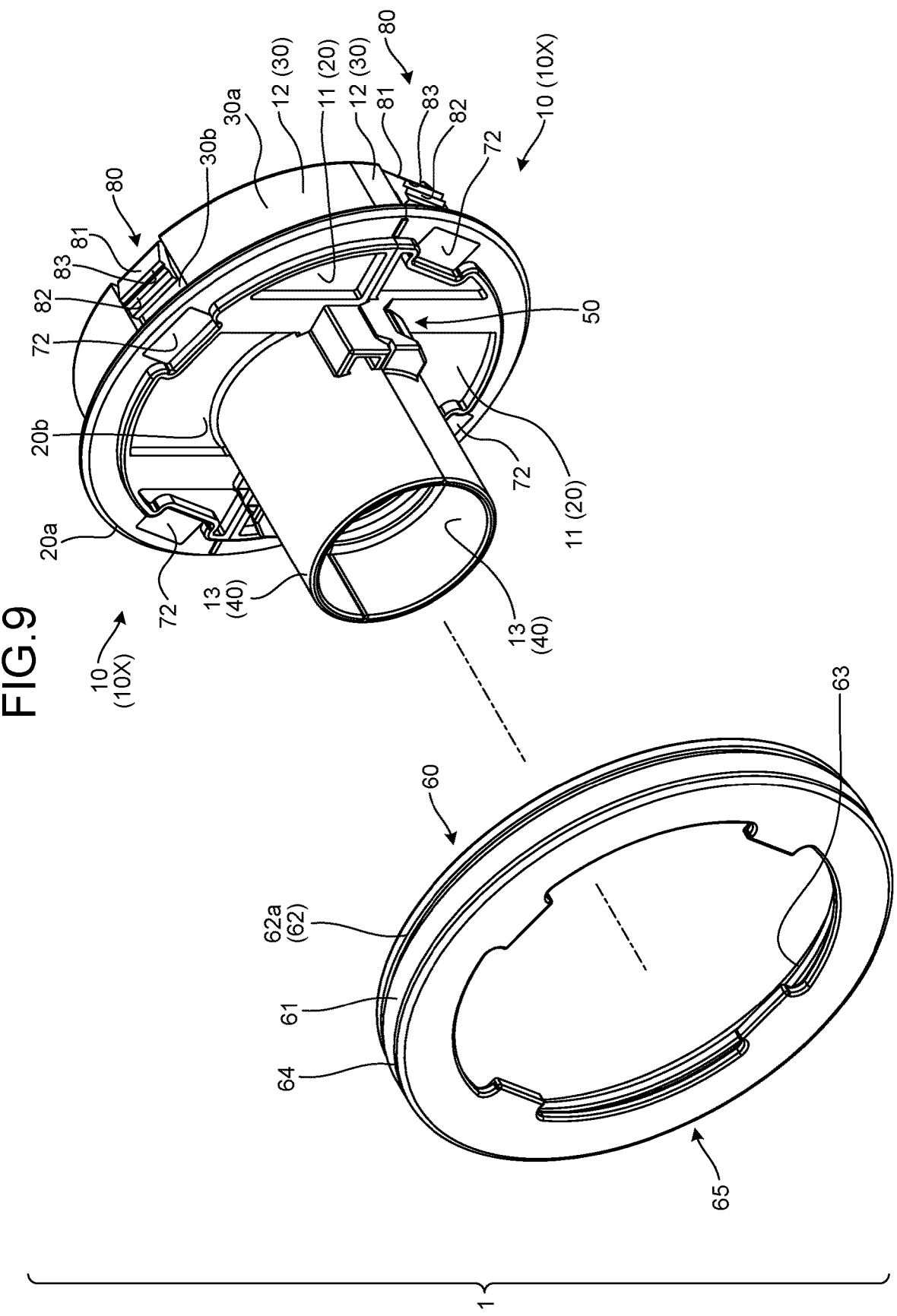
FIG. 9 is an exploded perspective view illustrating the grommet according to the embodiment separated into a water stop member and two base members after being assembled to each other.

As described above, main body portions (the split flange 11, the split cylinder 12, and the split tube 13) of each of the two base members 10, 10 have high hardness and are hardly elastically deformed. Due to this, for example, a minute gap due to surface roughness and the like of the bonding surfaces 10a of the two base members 10, 10 may be formed between the bonding surfaces 10a thereof. Thus, the grommet 1 according to the present embodiment includes, on at least one of the bonding surfaces 10a of the two base members 10, 10, a waterproof member (hereinafter, referred to as a "first waterproof member") 71 that is made of soft resin softer than the hard resin described above and able to be elastically deformed to eliminate the gap between the bonding surfaces 10a (FIG. 7, FIG. 8, and FIG. 10).

The first waterproof member 71 is, for example, formed by using a synthetic resin material such as an elastomer. Herein, in the grommet 1 according to the present embodiment, the flange 20 and the tubular body 40 are arranged on the vehicle exterior side, and the cylindrical body 30 is arranged on the vehicle interior side. Due to this, for the grommet 1, mainly required is an effect of preventing infiltration of liquid such as water from the vehicle exterior side to the vehicle interior side. Thus, the first waterproof member 71 may be disposed across respective bonding surfaces 10a of the split flange 11, the split cylinder 12, and the split tube 13, but may be disposed only across the respective bonding surfaces 10a of the split flange 11 and the split tube 13.

Figure 10:
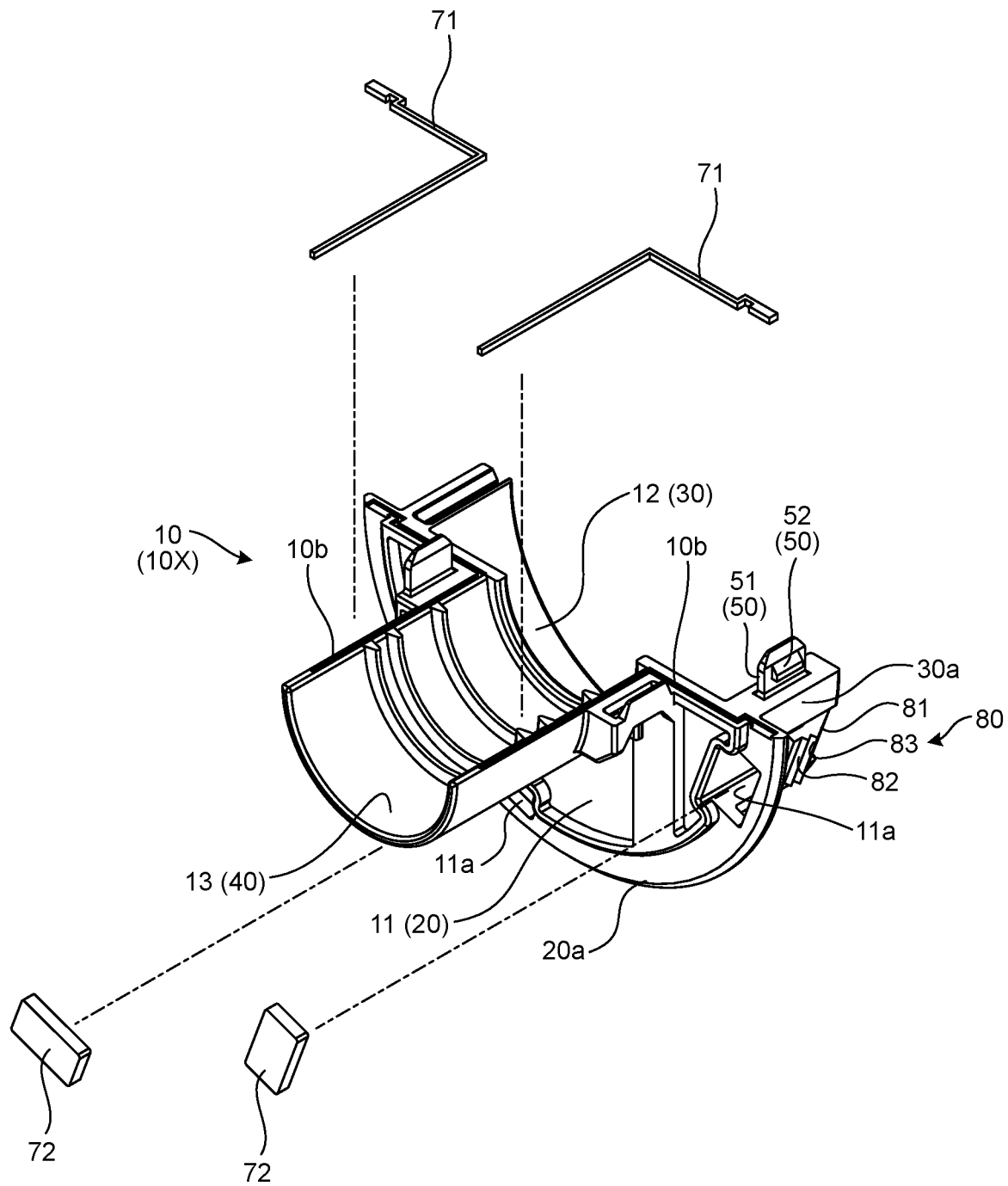
FIG. 10 is an exploded perspective view of the base member, a first waterproof member, and a second waterproof member.
Figure 11:
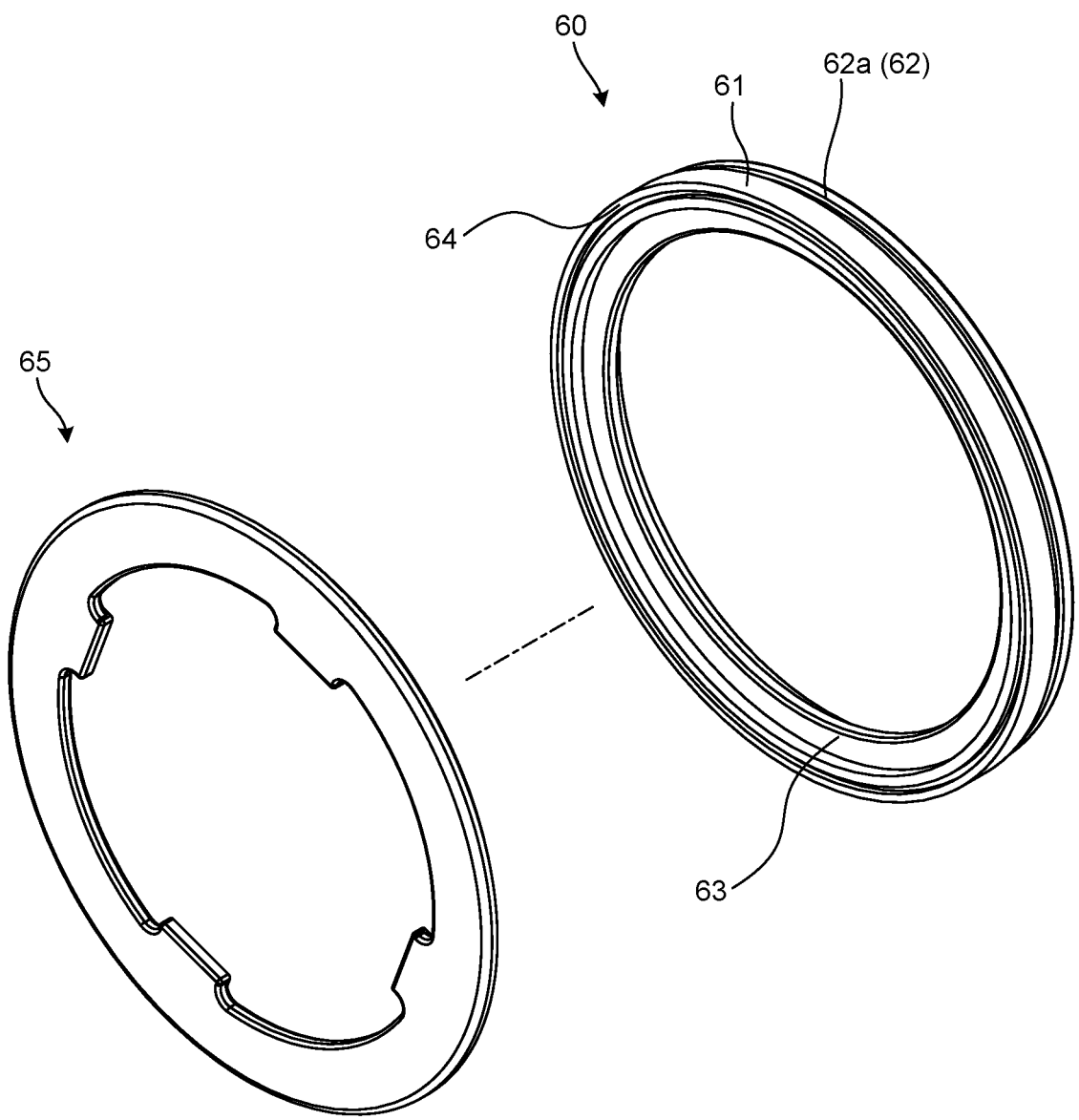
FIG. 11 is an exploded perspective view of the water stop member.

In the two base members 10, 10 described herein, groove parts 10b are formed across the bonding surface 10a of the split flange 11 and the bonding surface 10a of the split tube 13, and the first waterproof member 71 is fitted to each of the groove parts 10b (FIG. 10). The first waterproof member 71 is disposed on the groove part 10b of one of the two base members 10, 10, and projected from the groove part 10b. A projecting portion of the first waterproof member 71 is then fitted to the groove part 10b of the other one thereof by assembling the two base members 10 to each other. For example, the first waterproof member 71 may be made by two-color molding with one of the two base members 10, 10, may be formed integrally with one of the base members 10, 10 in a metal die, or may be formed as a component separated from one of the base members 10, to be bonded to the groove part 10b of one of the base members 10, 10 with a bonding agent and the like.

The base holding mechanism 50 is a holding mechanism for holding the two base members 10, 10 in a state in which the bonding surfaces 10a thereof abut on each other. A plurality of the base holding mechanisms 50 are disposed at a plurality of points between the two base members 10, 10. For example, the base holding mechanism 50 described herein includes a piece part 51 projected from the bonding surface 10a of one of the two base members 10, 10, and a first locking part 52 having a pawl shape projected from a wall surface of the piece part 51 (FIG. 7 and FIG. 8). The base holding mechanism 50 described herein includes: an insertion port 53 that is disposed on the bonding surface 10a of the other one of the two base members 10, 10, the insertion port 53 to which the piece part 51 and the first locking part 52 of the one bonding surface 10a are inserted; a flexible part 54 that is disposed on the other one of the two base members 10, 10, pressed and moved to be bent by the first locking part 52 inserted through the insertion port 53, and releases bending when the bonding surfaces 10a abut on each other and the first locking part 52 moves away; and a second locking part 55 that is disposed on the other one of the two base members 10, 10, disposed to be opposed to the first locking part 52 when the bonding surfaces 10a abut on each other, and holds the two base members 10, 10 in a state in which the bonding surfaces 10a abut on each other (FIG. 7 and FIG. 8).

Each of the two base members 10, 10 described herein includes a set of the piece part 51 and the first locking part 52 at one end in a circumferential direction of the split cylinder 12, and a set of the insertion port 53, the flexible part 54, and the second locking part 55 at another end in the circumferential direction of the split cylinder 12. In the two base members 10, 10, in a state in which the bonding surfaces 10a are kept abutting on each other, the first locking part 52 at the one end of the one split cylinder 12 is locked to the second locking part 55 at the other end of the other split cylinder 12, and the second locking part 55 at the other end of the one split cylinder 12 is locked to the first locking part 52 at the one end of the other split cylinder 12. That is, in the two base members 10, 10, the base holding mechanisms 50 are disposed at two points for coupling the split cylinders 12 to each other and holding them in a coupled state. Furthermore, each of the two base members 10, 10 includes a set of the piece part 51 and the first locking part 52 at one end in the circumferential direction of the split tube 13, and a set of the insertion port 53, the flexible part 54, and the second locking part 55 at another end in the circumferential direction of the split tube 13. In the two base members 10, 10, in a state in which the bonding surfaces 10a are kept abutting on each other, the first locking part 52 at the one end of the one split tube 13 is locked to the second locking part 55 at the other end of the other split tube 13, and the second locking part 55 at the other end of the one split tube 13 is locked to the first locking part 52 at the one end of the other split tube 13. That is, in the two base members 10, 10, the base holding mechanisms 50 are disposed at two points for coupling the split tubes 13 to each other and holding them in a coupled state.

The water stop member 60 is formed of a synthetic resin material that is softer than hard resin of the base member 10X (base member 10) and can be elastically deformed. Herein, for example, the water stop member 60 is formed by using soft resin such as an elastomer.

The water stop member 60 is disposed integrally with the base member 10X. The water stop member 60 includes an annular main body 61 that is disposed coaxially and integrally with a wall surface $20a_1$ on the one hole axis direction side of the outer peripheral part 20a of the flange 20, an annular lip (hereinafter, referred to as a "first lip") 62 that is coaxially projected from the main body 61 in the one hole axis direction and brought into intimate contact with the inner peripheral part 503a of the annular flat plate part 503 over a round in the circumferential direction while being elastically deformed, and an annular lip (hereinafter, referred to as a "second lip") 63 that is coaxially projected in the one hole axis direction from the main body 61 on an inner peripheral edge side than the first lip 62 and brought into intimate contact with the inner peripheral part 503a of the annular flat plate part 503 over a round in the circumferential direction while being elastically deformed (FIG. 1, FIG. 4, FIG. 6 to FIG. 9, and FIG. 11). In the water stop member 60, when not being elastically deformed, the first lip 62 is projected more than the second lip 63.

Herein, an intimate contact state of the first lip 62 with respect to the inner peripheral part 503a of the annular flat plate part 503 means an intimate contact state that may generate a sealing pressure equal to or higher than a required minimum sealing pressure caused by the first lip 62 required for securing a waterproof property therebetween. An intimate contact state of the second lip 63 with respect to the inner peripheral part 503a of the annular flat plate part 503 means an intimate contact state that may generate a sealing pressure equal to or higher than a required minimum sealing pressure caused by the second lip 63 required for securing a waterproof property therebetween.

For example, in a case in which the base member 10X is constituted of one member, the water stop member 60 may be formed as a member separated from the base member 10X and assembled to the outer peripheral part 20a of the flange 20 of the base member 10X, may be made by two-color molding with the base member 10X, or may be formed integrally with the outer peripheral part 20a of the flange 20 of the base member 10X in a metal die. However, in this example, the base member 10X is constituted of the two base members 10, assembled to each other, so that the water stop member is formed as a member separated from the base member and the water stop member 60 is assembled to the outer peripheral part 20a of the flange 20 of the base member 10X (the base members 10, 10 assembled to each other).

An annular member 65 formed of a synthetic resin material harder than the soft resin of the water stop member 60 described herein is disposed integrally and coaxially with the water stop member 60 (FIG. 1, FIG. 4, FIG. 6 to FIG. 9, and FIG. 11). The annular member 65 is a ring-shaped plate member that covers the outer peripheral part 20a of the flange 20 from the opposite side of the main body 61 of the water stop member 60. The annular member 65 is constituted of the same hard resin as that of the base member 10X (base member 10) or hard resin different from the former hard resin having hardness equivalent to that of the hard resin of the base member 10X (base member 10), and formed by using hard resin such as plastic, for example. Herein, by fitting the outer peripheral part 20a of the flange 20 into an annular gap formed between the water stop member 60 and the annular member 65, the water stop member 60 and the annular member are integrally assembled to the outer peripheral part of the flange 20.

In this assembled state, the main body 61 of the water stop member 60 is brought into intimate contact with the wall surface $20a_1$ of the outer peripheral part 20a of the flange 20 over a round in the circumferential direction in a state in which an outer peripheral part thereof is projected to the outside of the outer peripheral part 20a of the flange 20. The water stop member 60 includes an annular part 64 that is coaxially projected from an outer peripheral part of the main body 61 thereof in the other hole axis direction, and an outer peripheral part of the annular member 65 is integrated with the annular part 64 (FIG. 1, FIG. 4, FIG. 6 to FIG. 9, and FIG. 11). For example, the water stop member 60 may be made by two-color molding with the annular member 65, may be formed integrally with the annular member 65 in a metal die, or may be formed as a component separated from the annular member 65 to be bonded to the annular member 65 with a bonding agent and the like.

The grommet 1 configured as described above includes a holding mechanism 80 that causes the periphery of the through hole 502 (the annular flat plate part 503 and the annular projection part 504) of the insertion target 501 to hold the base member 10X (the base members 10, 10 assembled to each other) and the water stop member 60 (FIG. 2, and FIG. 4 to FIG. 9). The holding mechanism 80 described herein uses resilient force caused by elastic deformation of the first lip 62 and the second lip 63 of the water stop member 60. By sandwiching the periphery of the through hole 502 (the annular flat plate part 503 and the annular projection part 504) of the insertion target 501 by the first lip 62, the second lip 63, and a locking part (a first locking part 82 or a second locking part 83 described below) disposed on the base member 10X (base member 10), the grommet 1 is held by the periphery.

Figure 2:
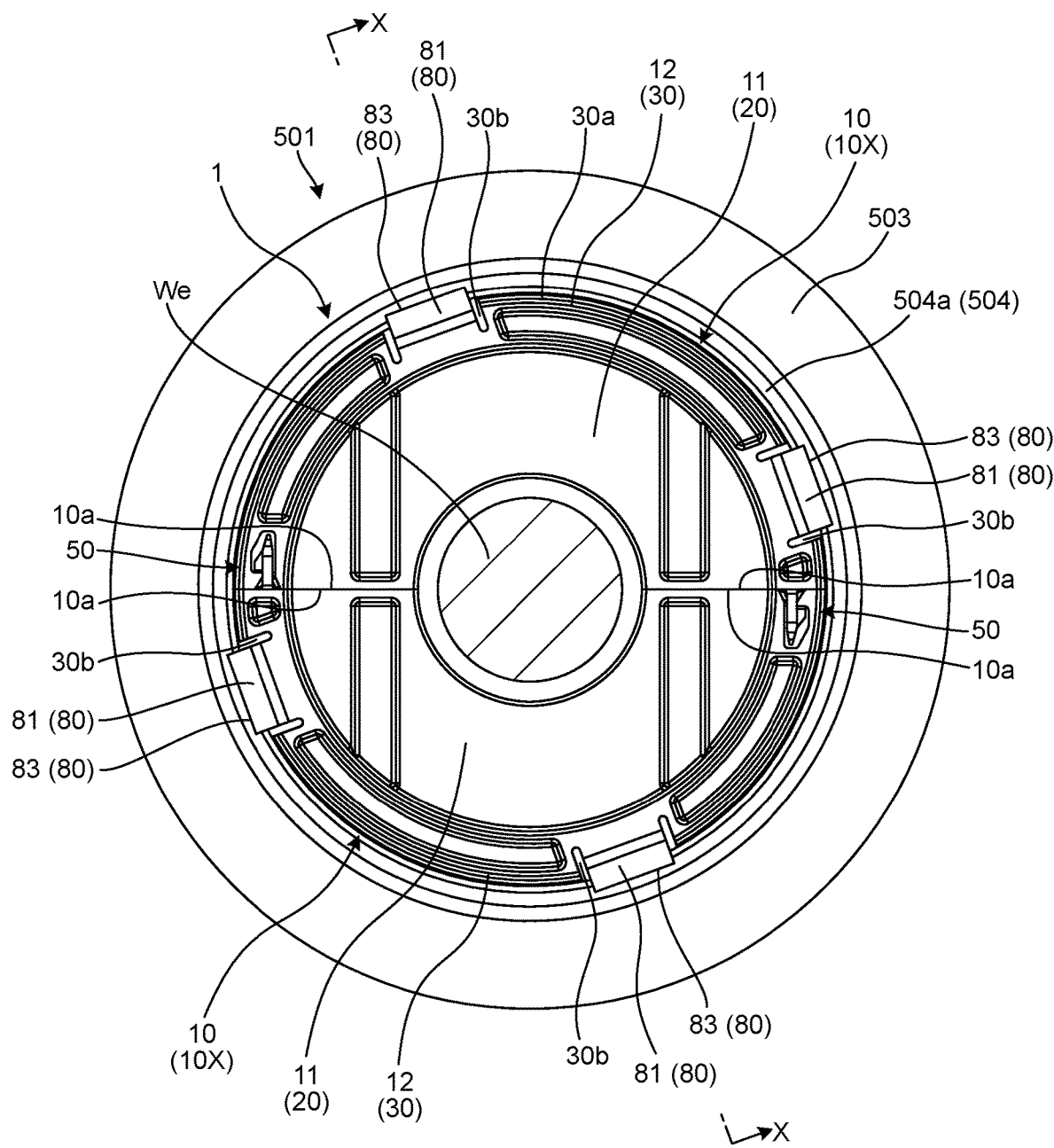
FIG. 2 is a plan view of the grommet according to the embodiment after being attached to the insertion target viewed from a vehicle interior side.
Figure 3:
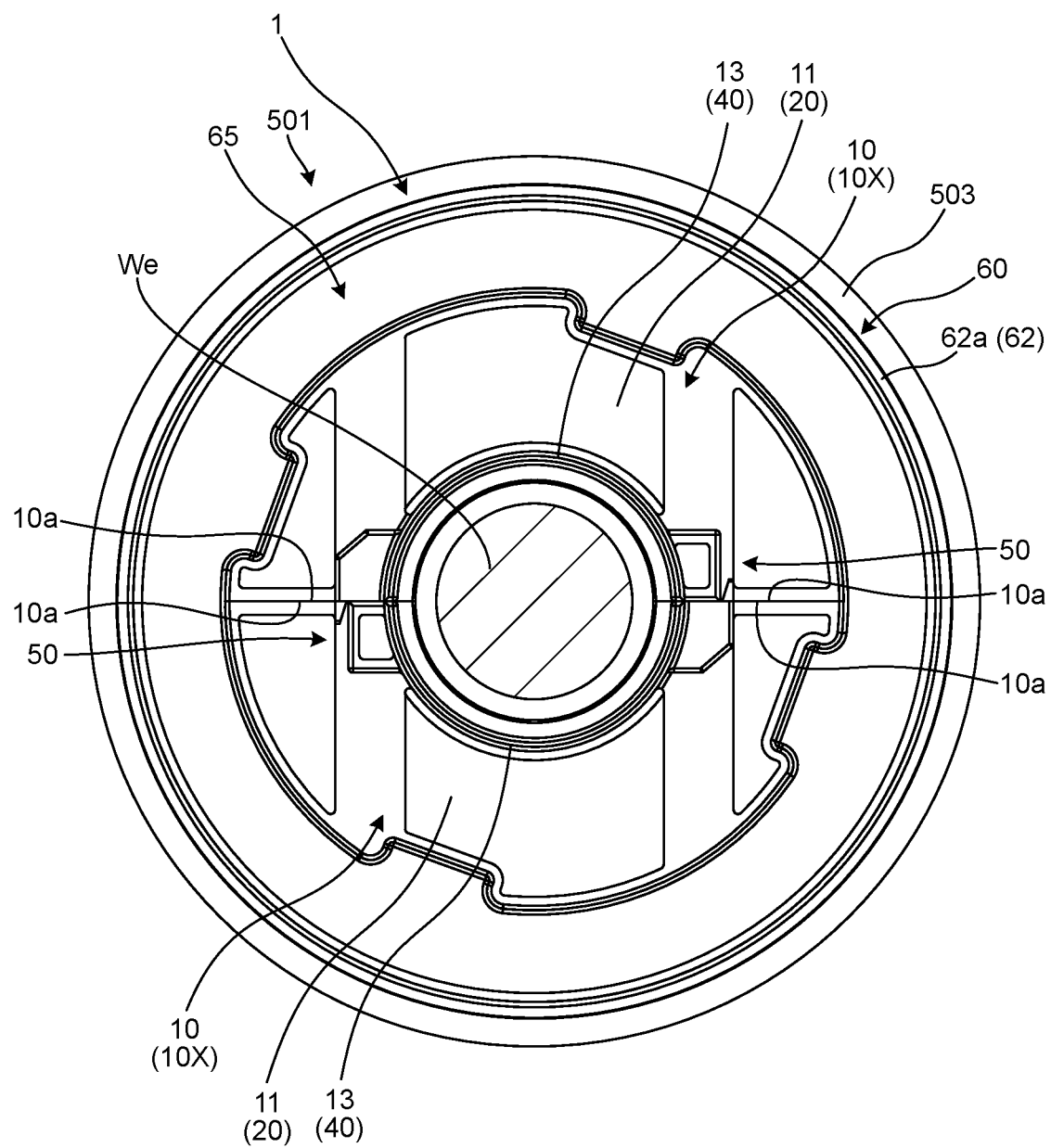
FIG. 3 is a plan view of the grommet according to the embodiment after being attached to the insertion target viewed from a vehicle exterior side.

The base member 10X includes a plurality of cantilever locking piece parts 81 disposed in the circumferential direction with respect to the cylindrical body 30. A tip of the cantilever locking piece part 81 folded back in the other hole axis direction from an outer peripheral surface 30a side of the cylindrical body 30 is caused to be a free end, the free end side is projected from the outer peripheral surface 30a of the cylindrical body 30, and the cantilever locking piece part 81 can be bent to change a projecting amount on the free end side from the outer peripheral surface 30a (FIG. 2, and FIG. 4 to FIG. 9). A fixed end of the locking piece part 81 is connected to a groove bottom of a groove part 30b obtained by notching part of the cylindrical body 30 from the outer peripheral surface 30a side (FIG. 2, FIG. 4, and FIG. 6). A plurality of combinations of the locking piece part 81 and the groove part 30b are disposed at regular intervals in the circumferential direction on the cylindrical body 30. On the cylindrical body 30 described herein, four combinations of the locking piece part 81 and the groove part 30b are disposed at regular intervals in the circumferential direction. Herein, two combinations of the locking piece part 81 and the groove part 30b are disposed on each of the split cylinders 12 of the base members 10.

The base member 10X also includes a plurality of locking parts that are disposed at respective free ends of the locking piece parts 81, and lock an end part on the one hole axis direction side of the annular projection part 504 (hereinafter, referred to as a "locking end part") 504a from the one hole axis direction side of the locking end part 504a. This locking part locks a portion of the locking end part 504a having a ring shape in the circumferential direction. A plurality of the locking parts are arranged in the hole axis direction at the free end of the locking piece part 81, and one of the locking parts adjacent to each other in the hole axis direction is arranged to be closer to the outer peripheral surface 30a side of the cylindrical body 30 and the flange 20 side than the other one thereof. Among the locking parts, a locking part arranged to be closest to the flange 20 in the hole axis direction is assumed to be the first locking part 82, and a locking part arranged to be farthest from the flange in the hole axis direction is assumed to be the second locking part 83 (FIG. 2, and FIG. 4 to FIG. 9). At the free end of the locking piece part 81 described herein, the two locking parts including the first locking part 82 and the second locking part 83 are disposed. The first locking part 82 is arranged to be closer to the outer peripheral surface 30a side of the cylindrical body 30 and the flange side than the second locking part 83.

The holding mechanism 80 is constituted of the four combinations of the locking piece part 81 and the locking parts (herein, the first locking part 82 and the second locking part 83), and the first lip 62 and the second lip 63 of the water stop member 60. The holding mechanism 80 causes the locking end part 504a of the annular projection part 504 to be locked by any one of the locking parts (herein, any one of the first locking part 82 and the second locking part 83), and causes pressing force of the first lip 62 and the second lip 63 in an elastically deformed state to act on the inner peripheral part 503a of the annular flat plate part 503 to cause the base member (the base members 10, 10 assembled to each other) and the water stop member 60 to be held by the periphery of the through hole 502 (the annular flat plate part 503 and the annular projection part 504) of the insertion target 501.

In the holding mechanism 80, when the cylindrical body is inserted into the through hole 502 of the insertion target 501, the locking piece part 81 to which force is applied from the inner peripheral surface of the annular projection part 504 enters the groove part 30b while being bent. Furthermore, along with the insertion of the cylindrical body 30, in the water stop member 60, the first lip 62 is brought into contact with the annular flat plate part 503 first, and subsequently, the second lip 63 is brought into contact with the annular flat plate part 503.

In the exemplified holding mechanism 80, when the cylindrical body 30 is continuously inserted into the through hole 502, the second locking part 83 gets over the locking end part 504a of the annular projection part 504, the second locking part 83 is arranged on the one hole axis direction side with respect to the locking end part 504a while bending of the locking piece part 81 is relieved, and the locking end part 504a and the second locking part 83 are enabled to be locked to each other. At this point, when the first lip 62 and the second lip 63 of the water stop member 60 are elastically deformed, the grommet 1 is pushed back toward the opposite side of the insertion direction into the through hole 502 by resilient force caused by the elastic deformation, so that the second locking part 83 is hooked by the locking end part 504a of the annular projection part 504 from the one hole axis direction side to be locked. Thus, the grommet 1 is held by the periphery of the through hole 502 (the annular flat plate part 503 and the annular projection part 504) of the insertion target 501. At this point, if elastic deformation of the first lip 62 and the second lip 63 causes a sealing pressure equal to or higher than the required minimum sealing pressure to be generated, the water stop member 60 can exhibit a waterproof property with the annular flat plate part 503.

In the holding mechanism 80, in a case in which the cylindrical body 30 is further continuously inserted into the through hole 502, the locking piece part 81 to which force is applied from the inner peripheral surface of the locking end part 504a starts to be bent toward the groove part 30b side again. In the holding mechanism 80, when the first locking part 82 gets over the locking end part 504a, the first locking part 82 is arranged on the one hole axis direction side with respect to the locking end part 504a while bending of the locking piece part 81 is relieved, and the locking end part 504a and the first locking part 82 are enabled to be locked to each other. At this point, when the first lip 62 and the second lip 63 of the water stop member 60 are elastically deformed, the grommet 1 is pushed back toward the opposite side of the insertion direction into the through hole 502 by resilient force caused by the elastic deformation, so that the first locking part 82 is hooked by the locking end part 504a of the annular projection part 504 from the one hole axis direction side to be locked. Thus, the grommet 1 is held by the periphery of the through hole 502 (the annular flat plate part 503 and the annular projection part 504) of the insertion target 501. At this point, if elastic deformation of the first lip 62 and the second lip 63 causes a sealing pressure equal to or higher than the required minimum sealing pressure to be generated, the water stop member 60 can exhibit a waterproof property with the annular flat plate part 503.

In the holding mechanism 80, when the first locking part 82 locks the locking end part 504a of the annular projection part 504 from the one hole axis direction side, the locking piece part 81 is pushed and moved from the inner peripheral surface side of the locking end part 504a to be elastically deformed. Thus, at this point, reaction force caused by the elastic deformation of the locking piece part 81 acts on the inner peripheral surface side of the locking end part 504a from the free end. In the holding mechanism 80, even when the second locking part 83 locks the locking end part 504a of the annular projection part 504 from the one hole axis direction side, the locking piece part 81 is pushed and moved from the inner peripheral surface side of the locking end part 504a to be elastically deformed. Thus, at this point, reaction force caused by the elastic deformation of the locking piece part 81 acts on the inner peripheral surface side of the locking end part 504a from the free end.

In this way, in the holding mechanism 80, the periphery of the through hole 502 (the annular flat plate part 503 and the annular projection part 504) of the insertion target 501 is sandwiched by any one of the locking parts (herein, any one of the first locking part 82 and the second locking part 83) of the base member 10X (the base members 10, 10 assembled to each other), and the first lip 62 and the second lip 63 in the elastically deformed state of the water stop member 60 to cause the grommet 1 to be held by the periphery. Due to this, in the holding mechanism 80, holding force of the grommet 1 with respect to the periphery of the through hole 502 of the insertion target 501 is secured, and the waterproof property of the first lip 62 and the second lip 63 is secured.

On the other hand, a dimensional tolerance is set for each part of the insertion target 501, and variations with respect to a design value (nominal value) are caused within a range of the dimensional tolerance. For example, a deviation is caused in a projecting amount P of the annular projection part 504 from the annular flat plate part 503 with respect to the nominal value due to a tolerance variation (FIG. 12 to FIG. 15). Strictly speaking, there is a dimensional tolerance in a plate thickness of the annular flat plate part 503. Thus, on the periphery of the through hole 502 of the insertion target 501, a distance from the annular flat plate part 503 to a distal end of the annular projection part 504 (locking end part 504a) is not necessarily equal to the nominal value corresponding to design in a sandwiching direction by any one of the locking parts (herein, any one of the first locking part 82 and the second locking part 83), the first lip 62, and the second lip 63. Particularly, the annular projection part 504 described herein is formed by burring processing as described above, so that a range of the tolerance variation is large.

Thus, the holding mechanism 80 is configured so that, when the projecting amount P of the annular projection part 504 falls within the range of the tolerance variation, the periphery of the through hole 502 of the insertion target 501 may be sandwiched by any one of the locking parts (herein, any one of the first locking part 82 and the second locking part 83), and the first lip 62 and the second lip 63 in the elastically deformed state to cause the grommet 1 to be held by the periphery. Specifically, in the holding mechanism 80, the first locking part 82 and the second locking part 83 among the locking parts (herein, the first locking part 82 and the second locking part 83 themselves) are arranged at positions described below, and the first lip 62 is elastically deformed as described below (elastically deformed to generate a sealing pressure equal to or higher than the required minimum sealing pressure) to cope with the tolerance variation in the projecting amount P of the annular projection part 504.

Figure 12:
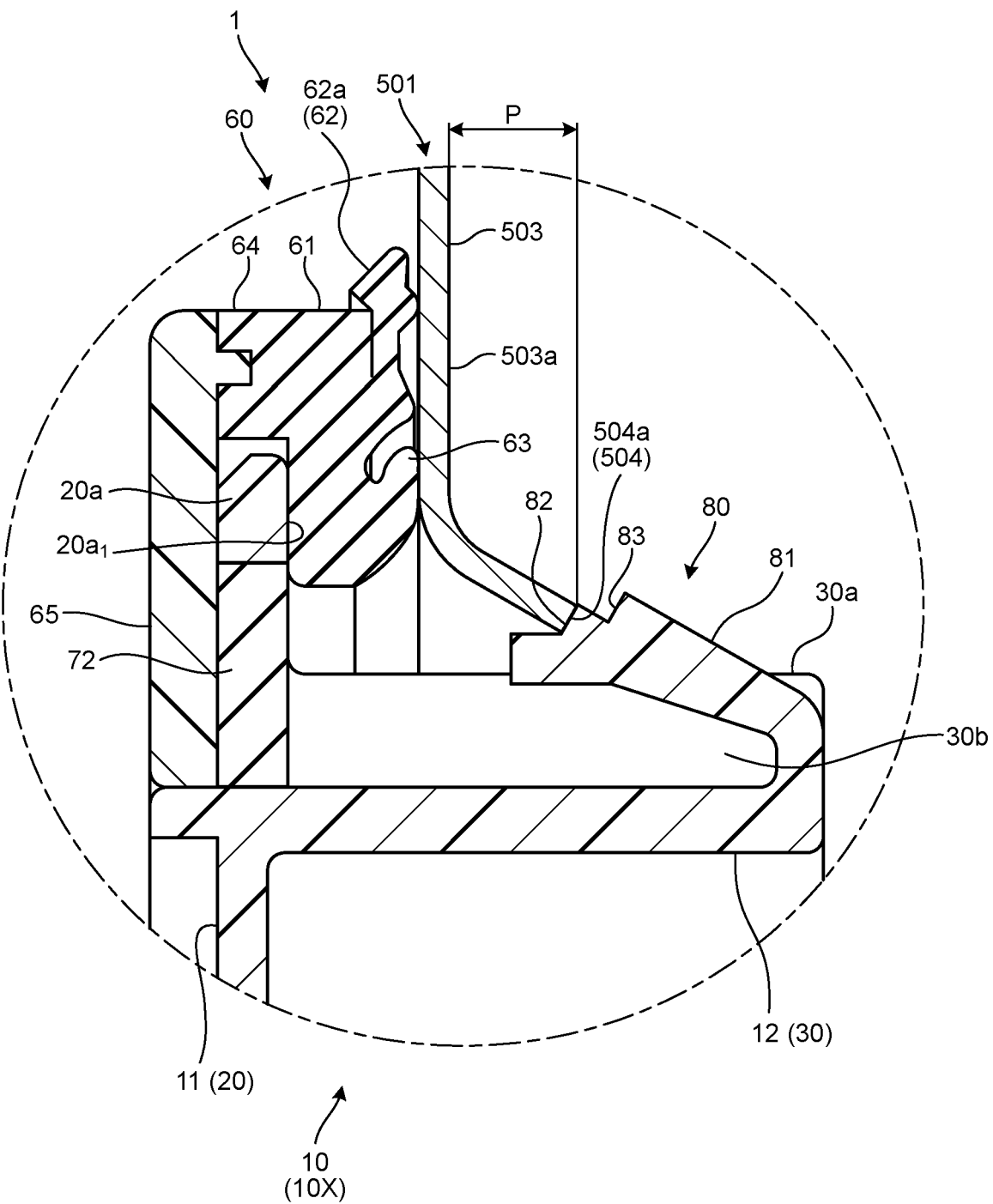
FIG. 12 is a diagram corresponding to the cross section along the line X-X in FIG. 2 illustrating an example of a normal grommet attachment form.
Figure 13:
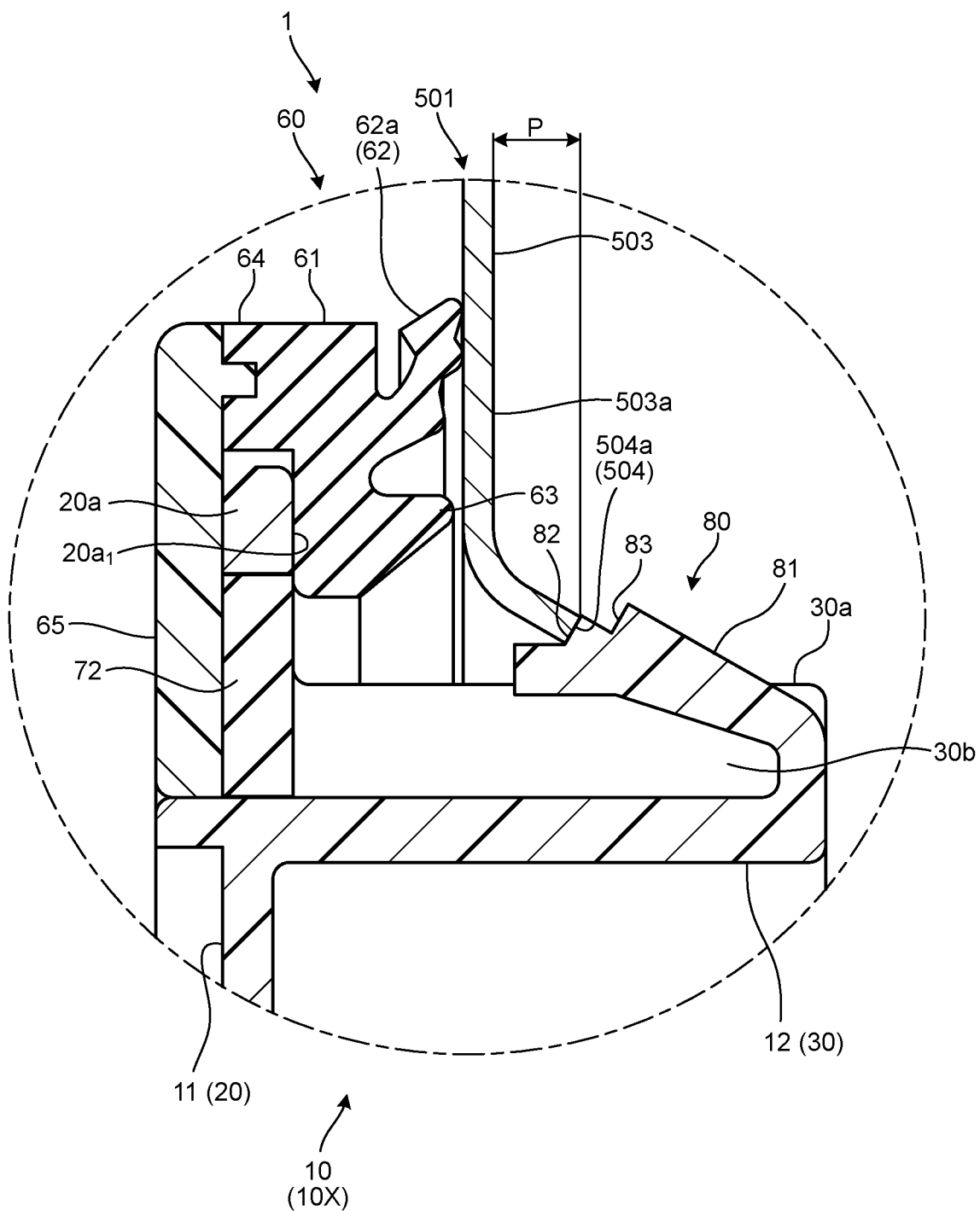
FIG. 13 is a diagram corresponding to the cross section along the line X-X in FIG. 2 illustrating an example of the normal grommet attachment form.

First, an arrangement place of the first locking part 82 viewed from the flange 20 in the hole axis direction of the through hole 502 is set at a position where an elastic deformation amount of the first lip 62 becomes maximum when the projecting amount P of the annular projection part 504 from the annular flat plate part 503 is the nominal value and the first locking part 82 locks the locking end part 504a (FIG. 4 and FIG. 12), and the first lip 62 is brought into intimate contact with the inner peripheral part 503a of the annular flat plate part 503 over a round in the circumferential direction while being elastically deformed when the projecting amount P is minimum within the range of the tolerance variation and the first locking part 82 locks the locking end part 504a (FIG. 13). Next, an arrangement place of the second locking part 83 viewed from the flange in the hole axis direction of the through hole 502 is set at a position where an elastic deformation amount of the first lip 62 becomes maximum when the projecting amount P of the annular projection part 504 from the annular flat plate part 503 is maximum within the range of the tolerance variation and the second locking part 83 locks the locking end part 504a (FIG. 14), and the first lip 62 is brought into intimate contact with the inner peripheral part 503a of the annular flat plate part 503 over a round in the circumferential direction while being elastically deformed when the projecting amount P is the nominal value and the second locking part 83 locks the locking end part 504a (FIG. 15).

Figure 15:
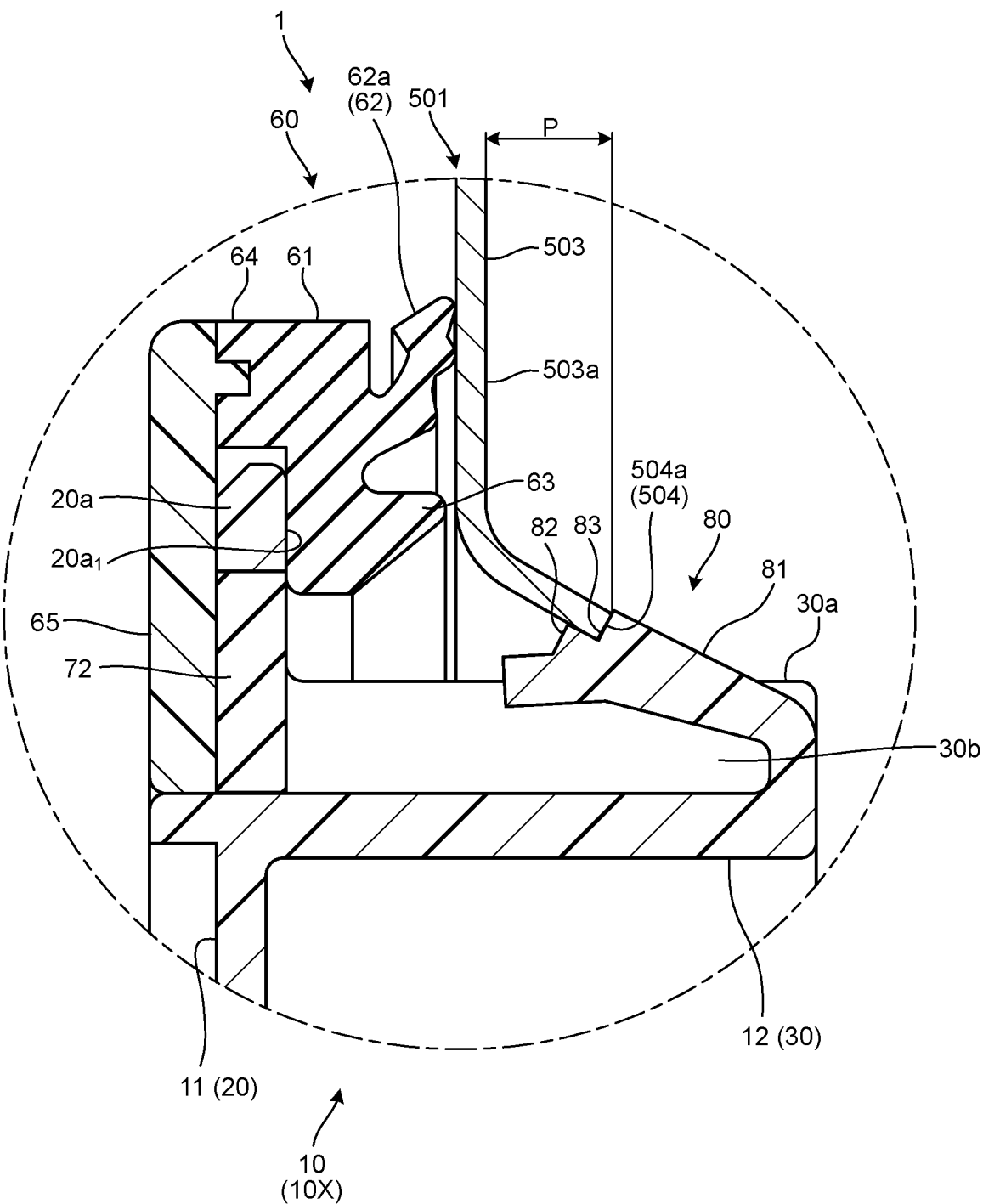
FIG. 15 is a diagram corresponding to the cross section along the line X-X in FIG. 2 illustrating an example of the normal grommet attachment form.

Due to this, when the projecting amount P of the annular projection part 504 is the nominal value, even if the locking end part 504a is locked by either one of the first locking part 82 and the second locking part 83, the first lip 62 can be brought into intimate contact with the inner peripheral part 503a of the annular flat plate part 503 over a round in the circumferential direction while being elastically deformed (FIG. 4, FIG. 12, and FIG. 15). Thus, in the holding mechanism 80, when the projecting amount P of the annular projection part 504 is the nominal value, the holding force of the grommet 1 with respect to the periphery of the through hole 502 of the insertion target 501 can be secured, and the waterproof property of at least the first lip 62 can be secured.

When the annular projection part 504 is formed with the projecting amount P between the nominal value and a minimum tolerance variation, by locking the locking end part 504a by the first locking part 82, the first lip 62 can be brought into intimate contact with the inner peripheral part 503a of the annular flat plate part 503 over a round in the circumferential direction while being elastically deformed (for example, FIG. 13). Due to this, in the holding mechanism 80, when the annular projection part 504 is formed with the projecting amount P between the nominal value and the minimum tolerance variation, the holding force of the grommet 1 with respect to the periphery of the through hole 502 of the insertion target 501 can be secured, and the waterproof property of at least the first lip 62 can be secured.

Figure 14:
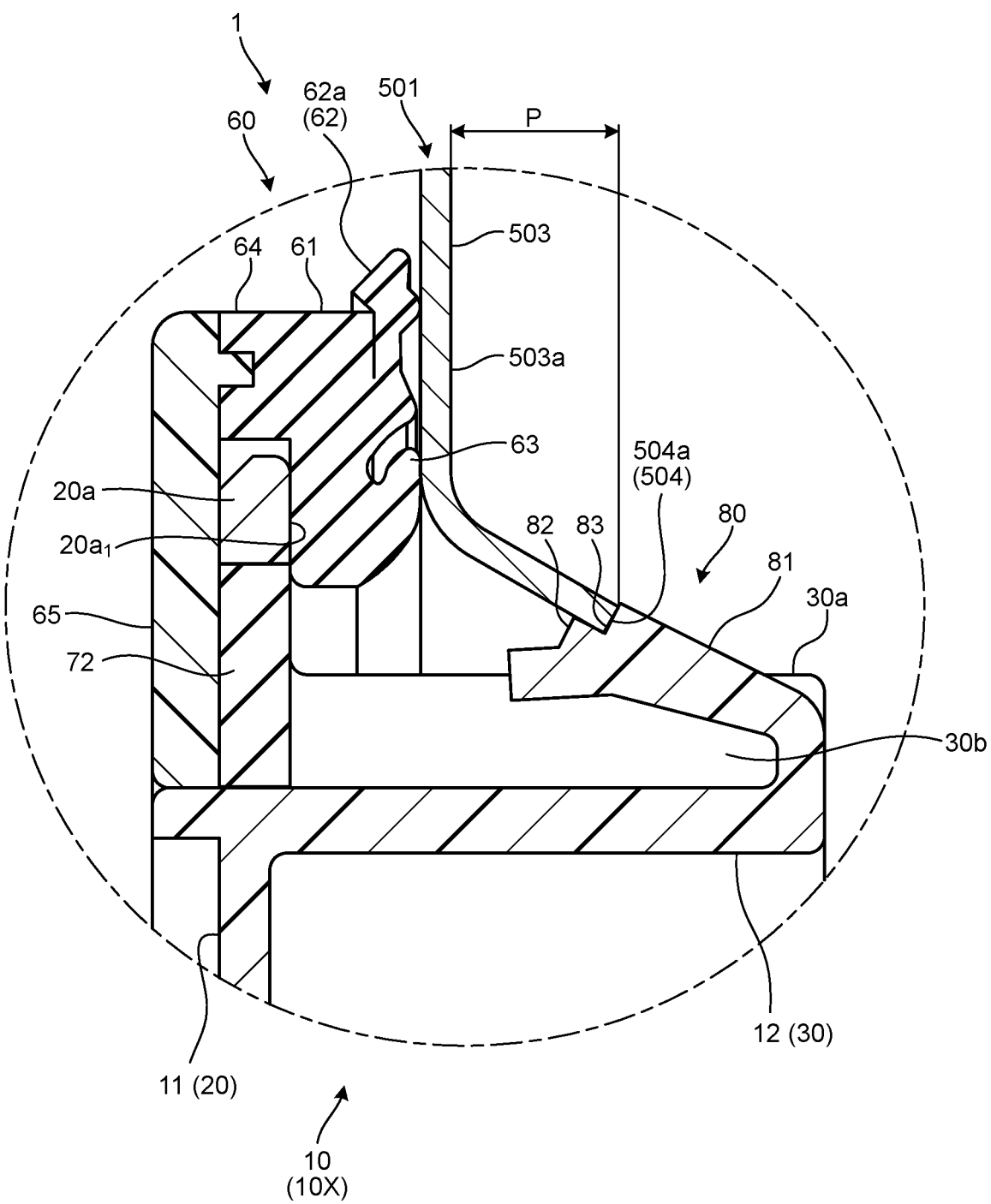
FIG. 14 is a diagram corresponding to the cross section along the line X-X in FIG. 2 illustrating an example of the normal grommet attachment form.

When the annular projection part 504 is formed with the projecting amount P between the nominal value and a maximum tolerance variation, by locking the locking end part 504a by the second locking part 83, the first lip 62 can be brought into intimate contact with the inner peripheral part 503a of the annular flat plate part 503 over a round in the circumferential direction while being elastically deformed (for example, FIG. 14). Due to this, in the holding mechanism 80, when the annular projection part 504 is formed with the projecting amount P between the nominal value and the maximum tolerance variation, the holding force of the grommet 1 with respect to the periphery of the through hole 502 of the insertion target 501 can be secured, and the waterproof property of at least the first lip 62 can be secured.

In this way, in the holding mechanism 80, as long as the projecting amount P of the annular projection part 504 falls within the range of the tolerance variation, the holding force of the grommet 1 with respect to the periphery of the through hole 502 of the insertion target 501 can be secured, and the waterproof property of at least the first lip 62 can be secured. However, the grommet 1 is inserted into the through hole 502 from the vehicle exterior side to the vehicle interior side, so that it is difficult to visually check whether the locking end part 504a is locked by any one of the locking parts on the vehicle interior side (herein, any one of the first locking part 82 and the second locking part 83). Thus, the holding mechanism 80 causes an operator and the like to determine whether the locking end part 504a is locked by any one of the locking parts (herein, any one of the first locking part 82 and the second locking part 83) by using the first lip 62 in the elastically deformed state instead of directly visually checking it.

Specifically, the first lip 62 is formed so that the inner peripheral surface side thereof is brought into intimate contact with the inner peripheral part 503a of the annular flat plate part 503 over a round in the circumferential direction by being elastically deformed to be inclined from a base on the main body 61 side of the water stop member 60. For example, the diameter of the first lip 62 described herein is gradually increased from the base toward a distal end 62a (FIG. 6).

The annular distal end 62a of the first lip 62 is projected toward the outer peripheral edge side of the annular flat plate part 503 more than both of the base member 10X (the base members 10, 10 assembled to each other) and the main body 61 of the water stop member 60 in all of a case in which the projecting amount P of the annular projection part 504 is the nominal value and the first locking part 82 locks the locking end part 504a, a case in which the projecting amount P of the annular projection part 504 is the nominal value and the second locking part 83 locks the locking end part 504a, a case in which the projecting amount P of the annular projection part 504 is minimum within the range of the tolerance variation and the first locking part 82 locks the locking end part 504a, and a case in which the projecting amount P of the annular projection part 504 is maximum within the range of the tolerance variation and the second locking part 83 locks the locking end part 504a (FIG. 3, FIG. 4, and FIG. 12 to FIG. 15). In this example, the distal end 62a of the first lip 62 is projected toward the outer peripheral edge side of the annular flat plate part 503 also with respect to an outer peripheral part of the annular member 65.

Figure 16:
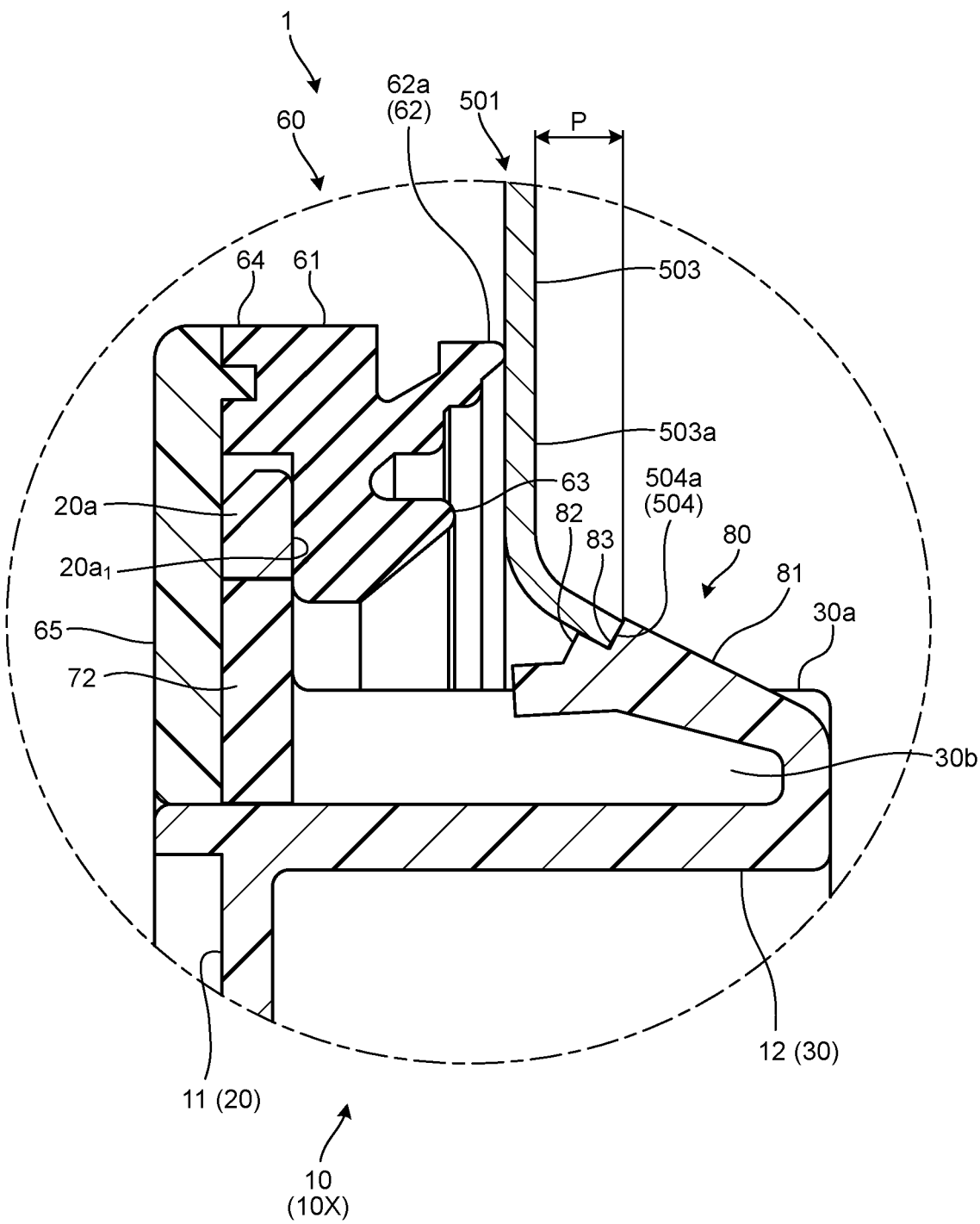
FIG. 16 is a diagram corresponding to the cross section along the line X-X in FIG. 2 illustrating an example deviating from the normal grommet attachment form.

On the other hand, when all of the conditions described above are not met (that is, when the locking end part 504a is not locked by any of the locking parts (herein, any of the first locking part 82 and the second locking part 83) irrespective of the projecting amount P of the annular projection part 504, or when the projecting amount P of the annular projection part 504 is minimum within the range of the tolerance variation and the second locking part 83 locks the locking end part 504a), the annular distal end 62a of the first lip 62 is not projected toward the outer peripheral edge side of the annular flat plate part 503 with respect to both of the base member 10X (the base members 10, 10 assembled to each other) and the main body 61 of the water stop member 60. For example, FIG. 16 illustrates a case in which the projecting amount P of the annular projection part 504 is minimum within the range of the tolerance variation and the second locking part 83 locks the locking end part 504a.

Due to this, when the projecting amount P of the annular projection part 504 is the nominal value, even if the locking end part 504a is locked by either one of the locking parts (herein, either one of the first locking part 82 and the second locking part 83), the distal end 62a of the first lip 62 is projected in an annular shape (herein, a ring shape) from the base member 10X (the base members 10, 10 assembled to each other), the main body 61 of the water stop member 60, and the annular member 65 (FIG. 4, FIG. 12, and FIG. 15). Thus, at this point, the distal end 62a of the first lip 62 projected in an annular shape can be visually checked by the operator and the like.

When the annular projection part 504 is formed with the projecting amount P between the nominal value and the minimum tolerance variation, if the first locking part 82 locks the locking end part 504a, the distal end 62a of the first lip 62 is projected in an annular shape (herein, a ring shape) from the base member 10X (the base members 10, assembled to each other), the main body 61 of the water stop member 60, and the annular member 65 (for example, FIG. 13). Thus, at this point, the distal end 62a of the first lip 62 projected in an annular shape can be visually checked by the operator and the like.

When the annular projection part 504 is formed with the projecting amount P between the nominal value and the maximum tolerance variation, if the second locking part 83 locks the locking end part 504a, the distal end 62a of the first lip 62 is projected in an annular shape (herein, a ring shape) from the base member 10X (the base members 10, assembled to each other), the main body 61 of the water stop member 60, and the annular member 65 (for example, FIG. 14). Thus, at this point, the distal end 62a of the first lip 62 projected in an annular shape can be visually checked by the operator and the like.

When the operator and the like can visually check the distal end 62a of the first lip 62 projected in an annular shape, the holding mechanism 80 can cause the operator and the like to recognize that the locking end part 504a is locked by any one of the locking parts (herein, any one of the first locking part 82 and the second locking part 83) (FIG. 3, FIG. 4, and FIG. 12 to FIG. 15). Thus, at this point, the holding mechanism 80 can cause the operator and the like to recognize that the holding force of the grommet 1 with respect to the periphery of the through hole 502 of the insertion target 501 is secured, and the waterproof property of at least the first lip 62 is secured.

On the other hand, all of the conditions described above are not met, the distal end 62a of the first lip 62 is not projected from the base member 10X (the base members 10, 10 assembled to each other), the main body 61 of the water stop member 60, and the annular flat plate part 503 (for example, FIG. 16). Due to this, at this point, the operator and the like cannot visually check the distal end 62a of the first lip 62. Thus, when the operator and the like cannot visually check the distal end 62a of the first lip 62 projected in an annular shape, the holding mechanism can cause the operator and the like to recognize that the locking end part 504a is not locked by any one of the locking parts (herein, any one of the first locking part 82 and the second locking part 83). Accordingly, at this point, the holding mechanism 80 can cause the operator and the like to recognize that the holding force of the grommet 1 with respect to the periphery of the through hole 502 of the insertion target 501 is not secured, and the waterproof property of the first lip 62 is not secured.

Herein, for example, the water stop member 60 and the annular member 65 are preferably formed in colors different from each other. Due to this, in this case, it is possible to improve a property of discriminating between a case in which the distal end 62a of the first lip 62 is projected and a case in which it is not projected.

In the base member 10X (base member 10), the locking piece part 81, the groove part 30b, the first locking part 82, and the second locking part 83 are formed by using a metal die (not illustrated). Due to this, in the base member 10X (base member 10), an extraction hole 11a (FIG. for extracting the metal die remains on the split flange 11, and the vehicle exterior side is connected to the vehicle interior side via the extraction hole 11a. Thus, a waterproof member (hereinafter, referred to as a "second waterproof member") 72 that fills the extraction hole 11a is disposed on each base member 10X (base member (FIG. 4, and FIG. 7 to FIG. 10).

The second waterproof member 72 is, for example, formed by using a synthetic resin material such as an elastomer. The second waterproof member 72 may be made by two-color molding with the base member 10X (base member or may be formed as a component separated from the base member 10X (base member 10) to be fitted into the extraction hole 11a and fixed by a bonding agent and the like.

In the grommet 1, a gap between the tubular body 40 and the wiring material We is not completely closed. Thus, the grommet 1 includes a closing member (not illustrated) that closes the gap between the tubular body 40 and the wiring material We from an outer side. The closing member is, for example, resin tape to be wound around the tubular body 40 and the wiring material We, and is wound around over an outer peripheral surface of the tubular body 40 and the wiring material We drawn out from the tubular body 40.

As described above, irrespective of the tolerance variation of the periphery of the through hole 502 of the insertion target 501 (the annular flat plate part 503 and the annular projection part 504), the grommet 1 according to the present embodiment can secure both of the waterproof property and the holding force at the periphery thereof.

Regarding the grommet 1, even when it is difficult to directly visually check whether the locking end part 504a is locked by any one of the locking parts (herein, any one of the first locking part 82 and the second locking part 83), it can be determined based on whether the distal end 62a of the first lip 62 is projected. Thus, with the grommet 1, even when the locking parts (herein, the first locking part 82 and the second locking part 83) are arranged at positions having poor visibility, it can be determined whether both of the waterproof property and the holding force are secured.

The grommet according to the present embodiment can secure, irrespective of tolerance variations of the periphery of the through hole of the insertion target, both of a waterproof property and holding force on the periphery.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
    a base member made of a synthetic resin material having an insulation property through which a wiring material having electrical conductivity is inserted to be passed through a through hole of an insertion target;
    an annular water stop member made of an elastically deformable synthetic resin material softer than the base member, and disposed integrally with the base member; and
    a holding mechanism that causes the base member and the water stop member to be held by an annular flat plate part on a periphery of the through hole of the insertion target and an annular projection part that is projected from an end part of an inner peripheral edge of the annular flat plate part toward one hole axis direction of the through hole, wherein
    the base member includes: an annular flange including an outer peripheral part that is disposed to be coaxially opposed to an inner peripheral part of the annular flat plate part with a gap in another hole axis direction of the through hole; a cylindrical body that has a cross section orthogonal to a hole axis of the through hole having a shape similar to a shape of a cross section of the annular projection part orthogonal to the hole axis of the through hole, and is coaxially projected from the flange toward the one hole axis direction to be inserted through the through hole on an inner side than the outer peripheral part of the flange; a plurality of cantilever locking piece parts disposed in a circumferential direction with respect to the cylindrical body, a tip of the cantilever locking piece part folded back in the other hole axis direction from an outer peripheral surface side of the cylindrical body being caused to be a free end, the free end side being projected from the outer peripheral surface of the cylindrical body, and the cantilever locking piece part being able to be bent to change a projecting amount on the free end side from the outer peripheral surface; and a plurality of locking parts that are disposed at respective free ends of the locking piece parts to lock a locking end part on the one hole axis direction side of the annular projection part from the one hole axis direction side of the locking end part,
    the water stop member includes: an annular main body that is disposed coaxially and integrally with a wall surface on the one hole axis direction side of the outer peripheral part of the flange; and an annular lip that is projected from the main body in the one hole axis direction, and brought into intimate contact with the inner peripheral part of the annular flat plate part over a round in a circumferential direction while being elastically deformed,
    the locking parts are arranged in the hole axis direction at the free end of the locking piece part, and one of the locking parts adjacent to each other in the hole axis direction is arranged to be closer to the outer peripheral surface side of the cylindrical body and the flange side than the other one of the adjacent locking parts, and
    the holding mechanism locks the locking end part by any one of the locking parts, and causes pressing force of the lip in an elastically deformed state to act on the inner peripheral part of the annular flat plate part to cause the base member and the water stop member to be held by the annular flat plate part and the annular projection part.

2. The grommet according to claim 1, wherein
    one of the locking parts arranged to be closest to the flange in the hole axis direction is assumed to be a first locking part, and one of the locking parts arranged to be farthest from the flange in the hole axis direction is assumed to be a second locking part,
    an arrangement place of the first locking part viewed from the flange in the hole axis direction is set at a position where an elastic deformation amount of the lip becomes maximum when a projecting amount of the annular projection part from the annular flat plate part is a nominal value and the first locking part locks the locking end part, and the lip is brought into intimate contact with the inner peripheral part of the annular flat plate part over a round in a circumferential direction while being elastically deformed when the projecting amount is minimum within a range of a tolerance variation and the first locking part locks the locking end part, and an arrangement place of the second locking part viewed from the flange in the hole axis direction is set at a position where the elastic deformation amount of the lip becomes maximum when the projecting amount of the annular projection part is maximum within the range of the tolerance variation and the second locking part locks the locking end part, and the lip is brought into intimate contact with the inner peripheral part of the annular flat plate part over a round in the circumferential direction while being elastically deformed when the projecting amount is the nominal value and the second locking part locks the locking end part.

3. The grommet according to claim 2, wherein an inner peripheral surface side of the lip is brought into intimate contact with the inner peripheral part of the annular flat plate part over a round in the circumferential direction by being elastically deformed to be inclined from a base on the main body side, and an annular distal end is projected toward an outer peripheral edge side of the annular flat plate part more than both of the base member and the main body of the water stop member in all of a case in which the projecting amount is the nominal value and the first locking part locks the locking end part, a case in which the projecting amount is the nominal value and the second locking part locks the locking end part, a case in which the projecting amount is minimum within the range of the tolerance variation and the first locking part locks the locking end part, and a case in which the projecting amount is maximum within the range of the tolerance variation and the second locking part locks the locking end part.

4. The grommet according to claim 2, wherein the base member includes a first base member and a second base member that are assembled to each other by causing bonding surfaces thereof to abut on each other to sandwich the wiring material, the first base member and the second base member respectively include split flanges to form the flange by causing the bonding surfaces thereof to abut on each other, and split cylinders to form the cylindrical body by causing the bonding surfaces thereof to abut on each other, and the water stop member is assembled to the outer peripheral part of the flange.

5. The grommet according to claim 1, wherein the locking parts lock the locking end part of the annular projection part formed by burring processing, one of the locking parts arranged to be closest to the flange in the hole axis direction is assumed to be a first locking part, and one of the locking parts arranged to be farthest from the flange in the hole axis direction is assumed to be a second locking part, an arrangement place of the first locking part viewed from the flange in the hole axis direction is set at a position where an elastic deformation amount of the lip becomes maximum when a projecting amount of the annular projection part from the annular flat plate part is a nominal value and the first locking part locks the locking end part, and the lip is brought into intimate contact with the inner peripheral part of the annular flat plate part over a round in a circumferential direction while being elastically deformed when the projecting amount is minimum within a range of a tolerance variation and the first locking part locks the locking end part, and an arrangement place of the second locking part viewed from the flange in the hole axis direction is set at a position where the elastic deformation amount of the lip becomes maximum when the projecting amount of the annular projection part is maximum within the range of the tolerance variation and the second locking part locks the locking end part, and the lip is brought into intimate contact with the inner peripheral part of the annular flat plate part over a round in the circumferential direction while being elastically deformed when the projecting amount is the nominal value and the second locking part locks the locking end part.

6. The grommet according to claim 5, wherein an inner peripheral surface side of the lip is brought into intimate contact with the inner peripheral part of the annular flat plate part over a round in the circumferential direction by being elastically deformed to be inclined from a base on the main body side, and an annular distal end is projected toward an outer peripheral edge side of the annular flat plate part more than both of the base member and the main body of the water stop member in all of a case in which the projecting amount is the nominal value and the first locking part locks the locking end part, a case in which the projecting amount is the nominal value and the second locking part locks the locking end part, a case in which the projecting amount is minimum within the range of the tolerance variation and the first locking part locks the locking end part, and a case in which the projecting amount is maximum within the range of the tolerance variation and the second locking part locks the locking end part.

7. The grommet according to claim 5, wherein the base member includes a first base member and a second base member that are assembled to each other by causing bonding surfaces thereof to abut on each other to sandwich the wiring material, the first base member and the second base member respectively include split flanges to form the flange by causing the bonding surfaces thereof to abut on each other, and split cylinders to form the cylindrical body by causing the bonding surfaces thereof to abut on each other, and the water stop member is assembled to the outer peripheral part of the flange.

8. The grommet according to claim 1, wherein the base member includes a first base member and a second base member that are assembled to each other by causing bonding surfaces thereof to abut on each other to sandwich the wiring material, the first base member and the second base member respectively include split flanges to form the flange by causing the bonding surfaces thereof to abut on each other, and split cylinders to form the cylindrical body by causing the bonding surfaces thereof to abut on each other, and the water stop member is assembled to the outer peripheral part of the flange.

\* \* \* \* \*